United States Patent
Kwon et al.

(10) Patent No.: US 7,593,451 B2
(45) Date of Patent: Sep. 22, 2009

(54) APPARATUS AND METHOD FOR COMMUNICATING PACKET DATA CONTROL CHANNEL IN A MOBILE COMMUNICATION SYSTEM

(75) Inventors: Hwan-Joon Kwon, Seoul (KR);
Ho-Kyu Choi, Songnam-shi (KR);
Young-Kwon Cho, Suwon-shi (KR);
Woo-Sang Hong, Seoul (KR);
Chang-Hun Bae, Seoul (KR);
Youn-Sun Kim, Seoul (KR); Jae-Sung Jang, Kwachon-shi (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/923,346

(22) Filed: Oct. 24, 2007

(65) Prior Publication Data

US 2008/0043683 A1 Feb. 21, 2008

Related U.S. Application Data

(62) Division of application No. 10/096,153, filed on Mar. 11, 2002, now Pat. No. 7,440,485.

(30) Foreign Application Priority Data

| Mar. 10, 2001 | (KR) | 2001-12475 |
| Mar. 19, 2001 | (KR) | 2001-14161 |
| Apr. 11, 2001 | (KR) | 2001-19373 |

(51) Int. Cl.
*H04B 1/707* (2006.01)

(52) U.S. Cl. .................................................. 375/147

(58) Field of Classification Search ................ 375/130, 375/147, 150, 140, 146, 295
See application file for complete search history.

(56) References Cited

U.S. PATENT DOCUMENTS

| 5,208,816 | A | * | 5/1993 | Seshardi et al. ............. 714/795 |
| 5,577,025 | A | | 11/1996 | Skinner et al. |
| 5,734,647 | A | | 3/1998 | Yoshida et al. |
| 5,734,967 | A | | 3/1998 | Kotzin et al. |
| 6,094,426 | A | | 7/2000 | Honkasalo et al. |
| 6,208,615 | B1 | | 3/2001 | Faruque et al. |
| 6,693,920 | B2 | | 2/2004 | Montojo et al. |
| 6,711,144 | B1 | | 3/2004 | Kim et al. |
| 6,731,668 | B2 | | 5/2004 | Ketchum |
| 6,788,685 | B1 | * | 9/2004 | Holtzman et al. ........... 370/391 |
| 6,930,981 | B2 | | 8/2005 | Gopalakrishnan et al. |
| 7,120,134 | B2 | * | 10/2006 | Tiedemann et al. ......... 370/329 |

* cited by examiner

*Primary Examiner*—Kevin M Burd
(74) *Attorney, Agent, or Firm*—The Farrell Law Firm, LLP

(57) ABSTRACT

A base station transmission apparatus for transmitting MAC (Medium Access Control) ID (Identification) information indicating a terminal to receive transmission packet data and length information of the transmission packet data in a mobile communication system for high-speed packet transmission, having an encoder for encoding a bit stream indicating the MAC ID information and generating coded symbols; a Walsh cover section for Walsh-covering the coded symbols from the encoder with a Walsh code based on the length information; and a Walsh spreader for spreading the Walsh-covered symbols from the Walsh cover section with a predetermined Walsh code.

5 Claims, 19 Drawing Sheets

APPARATUS AND METHOD FOR COMMUNICATING PACKET DATA CONTROL CHANNEL IN A MOBILE COMMUNICATION SYSTEM

PRIORITY

This application is a divisional of application Ser. No. 10/096,153, filed on Mar. 11, 2002, now U.S. Pat. No. 7,440,485, which claims priority to an application entitled "Apparatus and Method for Communicating Preamble Channel in a Mobile Communication System" filed in the Korean Industrial Property Office on Mar. 10, 2001 and assigned Serial No. 2001-12475, an application entitled "Apparatus and Method for Exchanging Packet Data Channel in a Mobile Communication System for High-Speed Packet Transmission" filed in the Korean Industrial Property Office on Mar. 19, 2001 and assigned Serial No. 2001-14161, and an application entitled "Apparatus and Method for Exchanging Packet Data Channel in a Mobile Communication System for High-Speed Packet Transmission" filed in the Korean Industrial Property Office on Apr. 11, 2001 and assigned Serial No. 2001-19373, the contents of all of which are hereby incorporated by reference.

BACKGROUND OF THE INVENTION

1. Field of the Invention

The present invention relates generally to a mobile communication system for high-speed packet transmission, and in particular, to an apparatus and method for communicating control information needed for demodulation of a packet data transmission channel.

2. Description of the Related Art

In general, a mobile communication system for high-speed packet transmission is divided into two systems, one system supporting only data transmission and another system supporting voice transmission as well as data transmission. The mobile communication system for high-speed packet transmission is designed to use a high-speed packet data transmission channel for a high-speed data service. The high-speed packet data transmission channel (e.g., a packet data channel (PDCH) of 1xEVDO and 1xEVDV) is shared by a plurality of users on a time division multiplexing (TDM) basis in order to transmit data at high speed.

In the mobile communication system for high-speed packet transmission, a transmitter transmits control information, to control the transmission of data. The data is transmitted through the high-speed packet data transmission channel on a TDM basis, over a packet data control channel (PDCCH), also known as a preamble channel. To provide a data service through the high-speed packet data transmission channel, a mobile terminal must receive control information for the data containing information pertaining to a destination, a data length, a data rate and a modulation mode, among others, of the data transmitted at a specific point in time.

The control information for the packet data includes subpacket length information, MAC (Medium Access Control) ID, data rate, modulation mode, payload size, subpacket ID (SPID), and ARQ (Automatic Repeat Request) channel ID. As mentioned above, in the mobile communication system for high-speed packet transmission, a transmission unit of the data transmitted through the high-speed packet data transmission channel is called a "subpacket", and the "subpacket length information" refers to the time required to transmit the data over the high-speed packet data transmission channel on a TDM basis. A system supporting a variable data length must transmit this information to the mobile terminals. The MAC ID, an identifier for mobile terminal identification, is assigned to the mobile terminal desiring to receive a high-speed packet data service during system access. The "data rate" is a transfer rate of data having the subpacket length, and the "modulation mode" indicates a selected one of QPSK (Quadrature Phase Shi Keying), 8PSK (8-ary Phase Shift Keying), 16QAM (16-ary Quadrature Amplitude Modulation) and 64QAM (64-ary QAM) modulations used to modulate the transmission data. The "payload size" refers to the number of information bits constituting one subpacket, and the subpacket ID (SPID), an identifier of each of the subpackets, is used to support retransmission. The ARQ channel ID, an identifier for supporting continuous data transmission to one mobile terminal, is used in identifying a parallel transmission channel.

As described above, in the mobile communication system for high-speed packet transmission, the control information transmitted over the packet data control channel includes 2-bit subpacket length information, 16-bit MAC ID, 2-bit payload size, 2-bit SPID and 2-bit ARQ channel ID, and the data rate and the modulation mode are determined depending on the 2-bit subpacket, the 2-bit payload size and Walsh function information used for packet data transmitted over a packet data transmission channel transmitted through another channel. Thus, upon receiving packet data after being assigned MAC ID during system access, a mobile terminal (or user) desiring to be provided with the high-speed packet data service demodulates the received packet data control channel and analyzes the MAC ID to determine whether the received packet is destined thereto. If so, the terminal demodulates the packet data using information on subpacket length, payload size, SPID and ARQ channel ID, acquired by demodulating the packet data and information on a Walsh function used for packet data channel transmission. Here, information on a data rate and a modulation mode of the received subpacket is determined based on a combination of the subpacket length, the payload size and the Walsh function used for the packet data channel.

For example, the mobile communication system for high-speed packet transmission transmits the packet data control information using two packet data control channels: a forward primary packet data control channel (PPDCCH) and a forward secondary packet data control channel (SPDCCH). Such packet data control channels are utilized along with the packet data channel (PDCH) on a code division multiplexing (CDM) basis. That is, the forward primary packet data control channel, the forward secondary packet data control channel and the packet data channel are assigned different code channels, and the channels are all transmitted on at the same time.

As descried above, since the packet data channel and the packet data control channels are simultaneously transmitted upon, it is very important for a receiver to promptly demodulate data on the two packet data control channels without error. Accordingly, there is a demand for a scheme capable of efficiently transmitting various control information for demodulation of data on the packet data channel.

SUMMARY OF THE INVENTION

It is, therefore, an object of the present invention to provide an apparatus and method for efficiently transmitting various control information needed for demodulation of a packet data transmission channel data in a mobile communication system for high-speed packet transmission.

It is another object of the present invention to provide an apparatus and method for covering coded symbols for MAC ID (or mobile terminal identification) information with a Walsh cover based on subpacket length information before transmission, in a mobile communication system for high-speed packet transmission.

It is further another object of the present invention to provide an apparatus and method for spreading coded symbols for subpacket length information with a Walsh code based on MAC ID information before transmission, in a mobile communication system for high-speed packet transmission.

To achieve the above and other objects, the present invention provides a base station transmission apparatus for transmitting MAC ID information indicating a mobile terminal to receive transmission packet data and length information of the transmission packet data in a mobile communication system for high-speed packet transmission. The base station transmission apparatus comprises an encoder for encoding a bit stream indicating the MAC ID information and generating coded symbols; a Walsh cover section for Walsh-covering the coded symbols from the encoder with a Walsh code based on the length information; and a Walsh spreader for spreading the Walsh-covered symbols from the Walsh cover section with a predetermined Walsh code.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the specifics such as a length and a number of the Walsh function used for spreading the forward packet data control channels (or preamble channels), the type of information and the number of information bits transmitted through the packet data control channels are provided by way of example for a better understanding of the present invention. It would be obvious to those skilled in the art that the invention may be implemented without the specifics contained in the examples, through modification thereof.

The term "forward link" as used herein refers to a transmission link from a base station to a terminal (or mobile terminal or mobile station), while the term "reverse link" refers to a transmission link from the terminal to the base station. In addition, the term "slot" as used herein refers to a minimum transmission unit of the forward link, and one slot is 1.25 ms long.

First Embodiment

Figure 1:
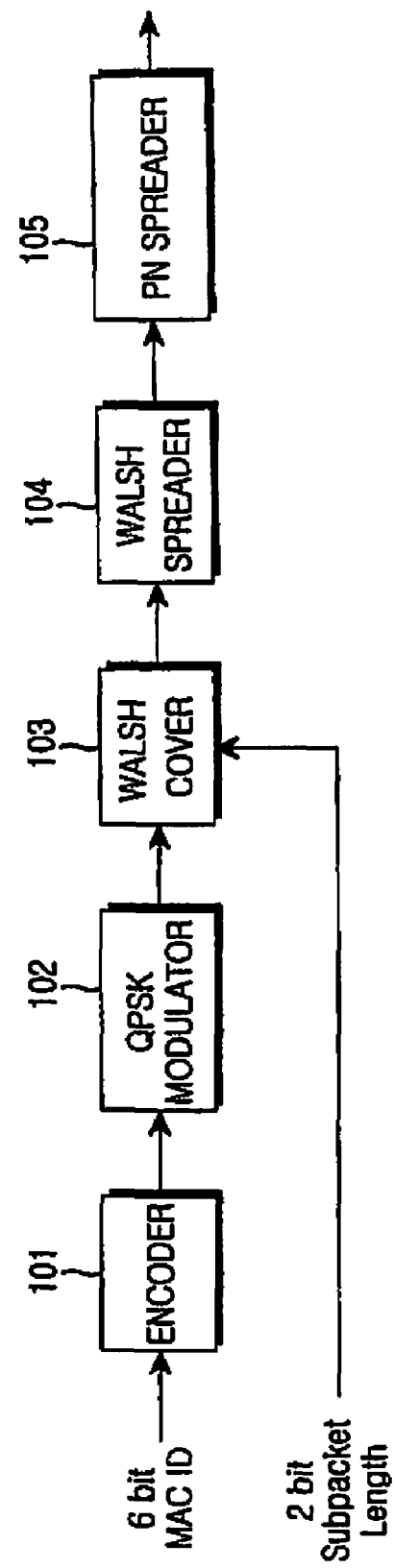
FIG. 1 illustrates a structure of a channel transmission device for transmitting MAC ID information and subpacket length information according to a first embodiment of the present invention.

FIG. 1 illustrates a structure of a channel transmission device for transmitting user identification (MAC ID) information and subpacket length information according to a first embodiment of the present invention. For example, the channel transmission device may serve as a PPDCCH (Primary Packet Data Control Channel) transmitter.

Referring to FIG. 1, an encoder 101 encodes 6-bit MAC ID information into 12 coded symbols. For example, a (12,6) block encoder can be used for the encoder 101. It will be assumed herein that the binary symbols output from the encoder 101 are mapped to +1 or −1 before being provided to a QPSK modulator 102. The QPSK modulator 102 QPSK-modulates the coded symbols from the encoder 101 and outputs a complex signal comprised of an I-channel signal (real signal) and a Q-channel signal (imaginary signal). A Walsh cover section 103 covers the complex signal from the QPSK modulator 102 with a Walsh code (or Walsh cover) of length 4 based on the subpacket length (2 bits). A Walsh spreader 104 spreads the Walsh-covered signal from the Walsh cover section 103 with a Walsh code of length 64. Finally, a PN (Pseudo Noise) spreader 105 spreads the Walsh-spread (or channel-spread) signal from the Walsh spreader 104 with a PN code and transmits the PN-spread signal. Although FIG. 1 has been described with reference to the case where the MAC ID information is comprised of 6 bits, the same structure can also be applied to another case where the number of MAC ID information bits has a different value. For example, when the MAC ID information is comprised of 5 bits, the (12,6) block encoder used for the encoder 101 must be replaced with a (12,5) block encoder.

The Walsh code of length 4 used by the Walsh cover section 103 for Walsh covering is determined by subpacket length information. As mentioned above, the subpacket length indicates the number of slots constituting a subpacket. The subpacket length is one of 1 slot, 2 slots, 4 slots and 8 slots. Therefore, when 4 Walsh codes of length 4 are used, it is possible to transmit all of the 4 Walsh codes in the identifiable form. Table 1 below illustrates how subpacket lengths are mapped with Walsh codes used for the Walsh covering. In Table 1, the Walsh codes are mapped by converting binary bits 0 and 1 to +1 and −1.

TABLE 1

| Subpacket Length | Mapped Walsh Code |
| --- | --- |
| 1 | 1 1 1 1 |
| 2 | 1 −1 1 −1 |
| 4 | 1 1 −1 −1 |
| 8 | 1 −1 −1 1 |

As illustrated in Table 1, when the subpacket length is 1 slot, the Walsh cover section 103 uses a Walsh code '1 1 1'. When the subpacket length is 2 slots, the Walsh cover section 103 uses a Walsh code '1-1 1-1' in Walsh covering the modulated symbols from the QPSK modulator 102. When the subpacket length is 4 slots, the Walsh cover section 103 uses a Walsh code '1 1-1-1'. When the subpacket length is 8 slots, the Walsh cover section 103 uses a Walsh code '1-1-1 1'. Table 1 shows only one kind of possible mappings between the subpacket lengths and the Walsh codes. There are other possible mappings between the subpacket lengths and the Walsh codes.

Figure 2:
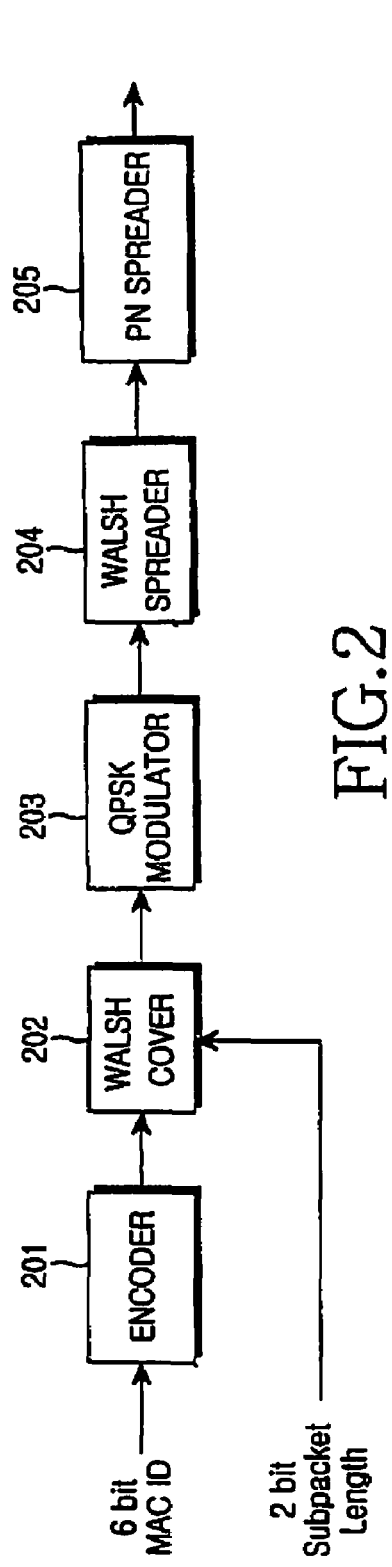
FIG. 2 illustrates a modified structure of the channel transmission device of FIG. 1.

FIG. 2 illustrates a modified structure of the channel transmission device of FIG. 1. In FIG. 2, the Walsh cover section is arranged following the encoder.

Referring to FIG. 2, an encoder 201 encodes 6-bit MAC ID information into 12 coded symbols. For example, a (12,6) block encoder can be used for the encoder 201. It will be assumed herein that the binary symbols output from the encoder 201 are mapped to +1 or −1 before being provided to a Walsh cover section 202. The Walsh cover section 202 covers the coded symbols output from the encoder 101 with a Walsh code of length 4 based on the subpacket length (2 bits). The subpacket length and the Walsh code used for the Walsh covering are selected from Table 1. A QPSK modulator 203 QPSK-modulates the Walsh-covered signal from the Walsh cover section 202 and outputs a complex signal comprised of an I-channel signal (real signal) and a Q-channel signal (imaginary signal). A Walsh spreader 204 spreads the complex signal from the QPSK modulator 203 with a Walsh code of length 64. Finally, a PN spreader 205 spreads the Walsh-spread signal from the Walsh spreader 204 with a PN code and transmits the PN-spread signal. Although FIG. 2 has been described with reference to the case where the MAC ID information is comprised of 6 bits, the same structure can also be applied to another case where the number of MAC ID information bits has a different value. For example, when the MAC ID information is comprised of 5 bits, the (12,6) block encoder used for the encoder 201 must be replaced with a (12,5) block encoder.

Figure 3:
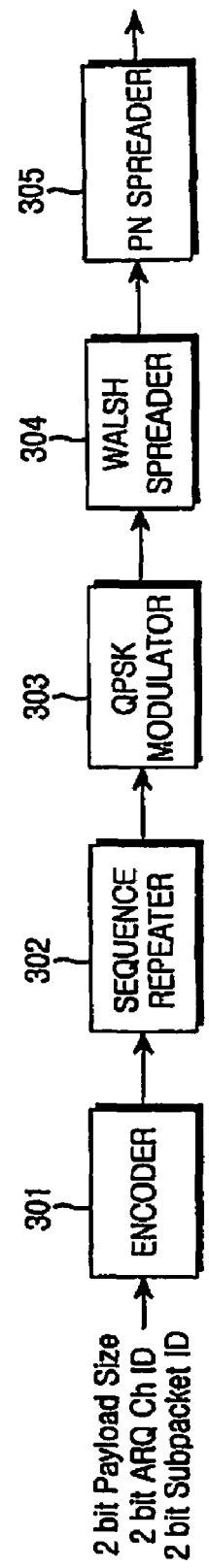
FIG. 3 illustrates a structure of a channel transmission device for transmitting remaining control information excepting the MAC ID information and the subpacket length according to the first embodiment of the present invention.

FIG. 3 illustrates a structure of a channel transmission device for transmitting the remaining control information excepting the MAC ID information and the subpacket length according to the first embodiment of the present invention. As illustrated, the "remaining control information" may include payload size information, ARQ channel ID information and subpacket ID (SPID). For example, the channel transmission device may serve as a SPDCCH (Secondary Packet Data Control Channel) transmitter.

Referring to FIG. 3, an encoder 301 encodes an information bit stream corresponding to the remaining control information and outputs coded symbols. For example, a (48,6) block encoder can be used for the encoder 301. It will be assumed herein that the payload size information, the ARQ channel ID information and the subpacket ID information are each comprised of 2 bits, and the encoder 301 receives a total of 6 information bits and outputs 48 symbols. A sequence repeater 302 repeats the coded symbols from the encoder 301 a predetermined number of times according to the number of slots where the coded symbols are transmitted. The number of repetitions, the number of time slots occupied by the coded symbols, is determined depending on length information of packet data (subpacket length information). A QPSK modulator 303 QPSK-modulates the output signal of the sequence repeater 302 and outputs a complex signal comprised of an I-channel signal and a Q-channel signal. A Walsh spreader 304 spreads the complex signal from the QPSK modulator 303 with a Walsh code of length 64. Finally, a PN spreader 305 spreads the Walsh-spread signal from the Walsh spreader 304 with a PN code and transmits the PN-spread signal.

Although FIG. 3 has been described with reference to the case where the (48,6) block encoder is used for the encoder 301, the (48,6) block encoder may be replaced with a (12,6) or (24,6) block encoder. In this case, a length of the Walsh code used by the Walsh spreader 304 should be adjusted in order to maintain a transmission period of the SPDCCH, i.e., a transmission period of the coded symbols generated by the encoder 301. For example, when the (24,6) block encoder is used, the Walsh spreader 304 uses a Walsh code of length 128 for spreading. That is, a length of the codeword (coded symbols) output from the encoder is in inverse proportion to a length of the Walsh code used for spreading. In addition, even though the number of information bits transmitted over the SPDCCH is not 6, it is possible to transmit the control information in the same manner by changing the block code used by the encoder 301.

Figure 4:
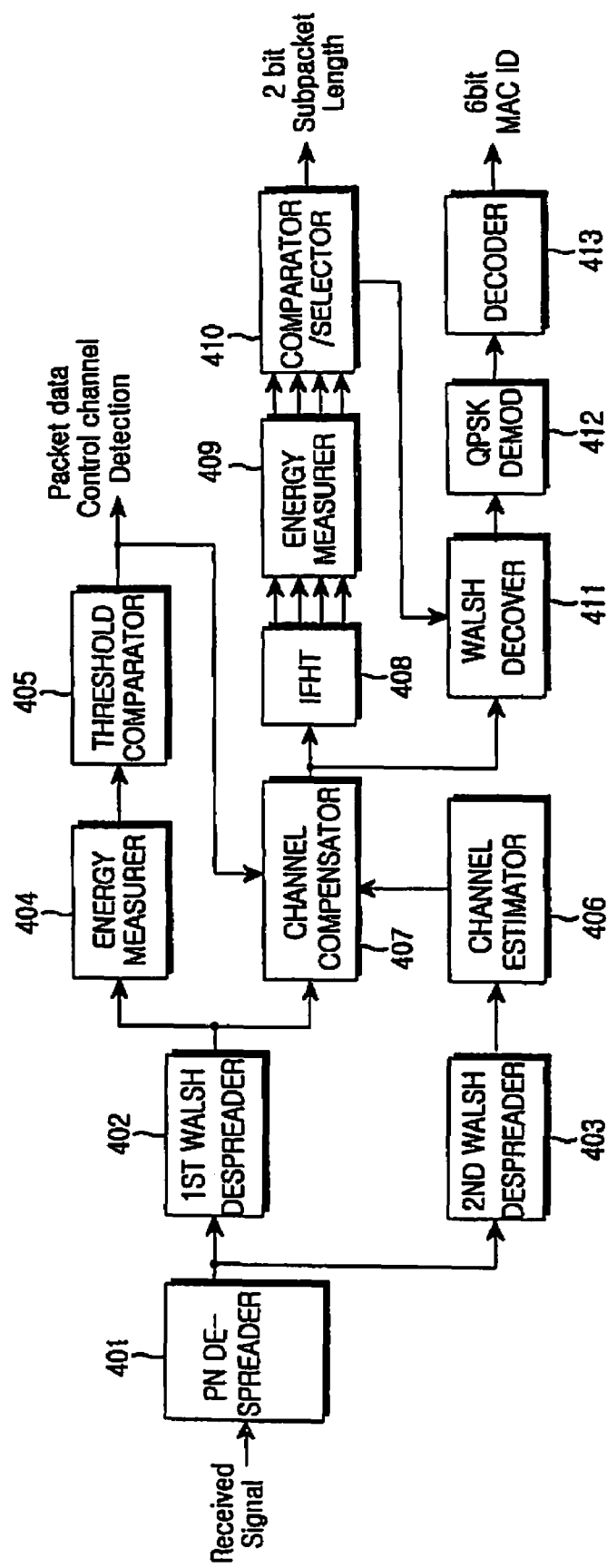
FIG. 4 illustrates a structure of a channel reception device for receiving the MAC ID information and the subpacket length information according to the first embodiment of the present invention.

FIG. 4 illustrates a structure of a channel reception device for receiving the MAC ID information and the subpacket length information according to the first embodiment of the present invention. The channel reception device of FIG. 4 has a structure corresponding to the channel transmission device of FIG. 1.

Referring to FIG. 4, a PN despreader 401 despreads a received signal with a specific PN code. A first Walsh despreader 402 despreads the PN-despread signal from the PN despreader 401 with a specific Walsh code used for transmission of the PPDCCH. A second Walsh despreader 403 despreads the PN-despread signal from the PN despreader 401 with a Walsh code for a pilot channel. An output of the first Walsh despreader 402 is provided to an energy measurer 404 and a channel compensator 407. Meanwhile, an output of the second Walsh despreader 403 is provided to a channel estimator 406. The channel estimator 406 performs channel estimation using the pilot channel signal from the second Walsh despreader 403, and complex-conjugates the channel estimated signal into a channel compensated signal. The channel compensator 407 performs channel compensation by multiplying the signal from the first Walsh despreader 402 and the channel compensated signal from the channel estimator 406.

The energy measurer 404 and a threshold comparator 405 constitute a device for determining whether the PPDCCH is received or not. The energy measurer 404 measures energy of the despread symbols from the first Walsh despreader 402. An operation of the energy measurer 404 is well known in the art, so a detailed description will be avoided. The threshold comparator 405 compares a measured energy value from the energy measurer 404 with a predetermined threshold, and outputs a packet data control detection signal. As the result of comparison, if the measured energy value is larger than the threshold, the channel compensator 407 is enabled in response to the resultant signal from the threshold comparator 405. This means a case where the PPDCCH is received at high power, thus enabling demodulation of the PPDCCH. Otherwise, if the measured energy value is smaller than the threshold, the channel compensator 407 is disabled in response to the resultant signal from the threshold comparator 405. This means a case where the PPDCCH is not received or received with low reliability, thus disabling demodulation of the PPDCCH. As stated above, the first embodiment of the present invention first determines reception and reliability of the PPDCCH by the energy measurer 404 and the threshold comparator 405, and then demodulates the PPDCCH according to the determined result. In order to minimize a processing time, it is possible to perform the two processes in parallel.

An inverse fast Hadamard transformer (IFHT) 408 performs inverse fast Hadamard transform on the channel compensated signal from the channel compensator 407 in a unit of 4 symbols. The reason for performing the inverse fast Hadamard transform by the IFHT 408 is to search for a Walsh code (or Walsh cover) used by the Walsh cover 103 of FIG. 1. That is, the signal output from the IFHT 408 in a unit of 4 symbols becomes correlations between the received signal and the 4 Walsh codes listed in Table 1. An energy measurer 409 measures energy of the correlations from the IFHT 408. Here, the energy measurement is performed for one slot where the PPDCCH is transmitted. The energy measurer 409 measures energy of the Walsh covers for the one slot. A comparator/selector 410 compares the measured energy values from the energy measurer 409, and selects subpacket length information corresponding to a Walsh cover having the greatest energy value. Here, the comparator/selector 410 includes the mapping table of Table 1, and reads from the mapping table a subpacket length corresponding to the Walsh cover having the greatest energy value. The comparator/selector 410 provides the Walsh cover having the greatest energy value to a Walsh decover section 411.

The Walsh decover section 411 decovers the signal from the channel compensator 407 with the Walsh cover from the comparator/selector 410. A QPSK demodulator 412 demodulates a complex signal from the Walsh decover section 411 into a real signal, and outputs demodulated symbols. A decoder 413 decodes the demodulated symbols from the QPSK demodulator 412 and outputs a 6-bit information bit stream corresponding to the MAC ID information. For example, a (12,6) block decoder is used for the decoder 413. Although FIG. 4 has been described with reference to the case where the MAC ID information is comprised of 6 bits, the same structure can also be applied to another case where the number of MAC ID information bits has a different value. For example, when the MAC ID information is comprised of 5 bits, the (12,6) block decoder used for the decoder 413 must be replaced with a (12,5) block decoder.

Figure 5:
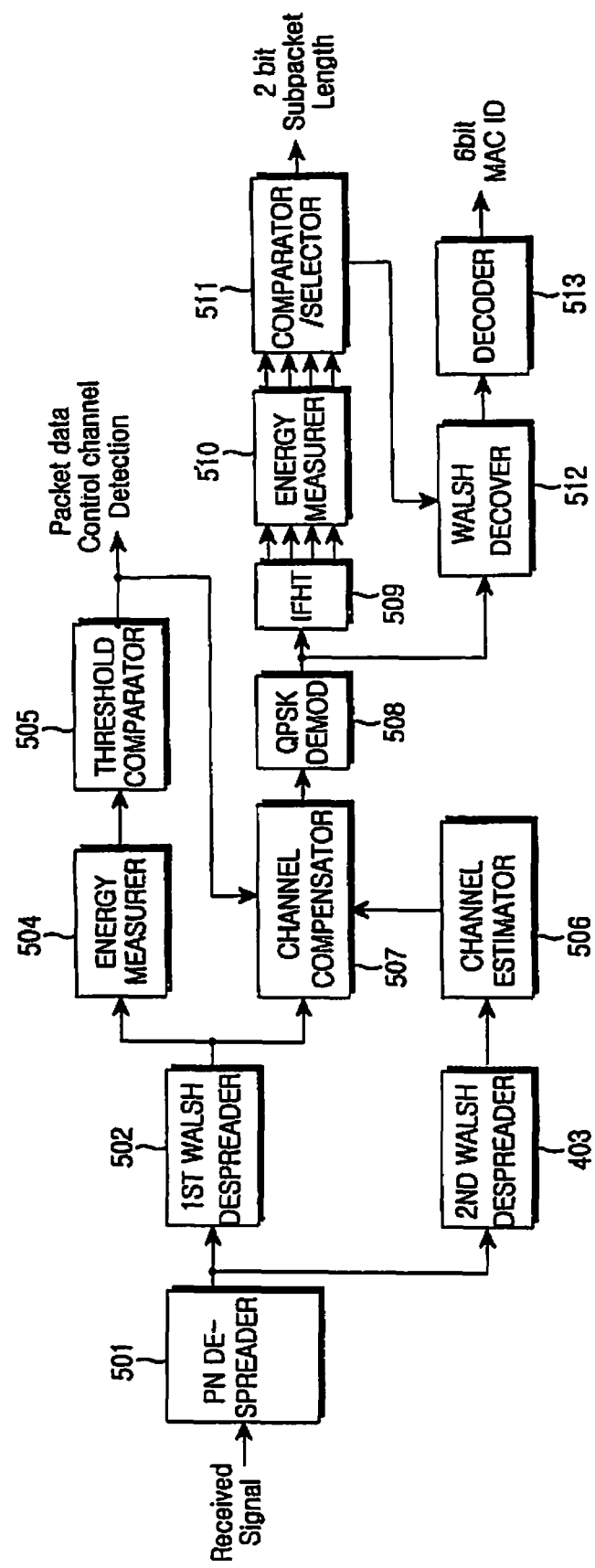
FIG. 5 illustrates a modified structure of the channel reception device of FIG. 4.

FIG. 5 illustrates a modified structure of the channel reception device of FIG. 4. In particular, the channel reception device of FIG. 5 has a structure corresponding to the channel transmission device of FIG. 2.

Referring to FIG. 5, a PN despreader 501 despreads a received signal with a specific PN code. A first Walsh despreader 502 despreads the PN-despread signal from the PN despreader 501 with a specific Walsh code used for transmission of the PPDCCH. A second Walsh despreader 503 despreads the PN-despread signal from the PN despreader 501 with a Walsh code for a pilot channel. An output of the first Walsh despreader 502 is provided to an energy measurer 504 and a channel compensator 507. Meanwhile, an output of the second Walsh despreader 503 is provided to a channel estimator 506. The channel estimator 506 performs channel estimation using the pilot channel signal from the second Walsh despreader 503, and complex-conjugates the channel estimated signal into a channel compensated signal. The channel compensator 507 performs channel compensation by multiplying the signal from the first Walsh despreader 502 and the channel compensated signal from the channel estimator 506.

The energy measurer 504 and a threshold comparator 505 constitute a device for determining whether the PPDCCH is received or not. The energy measurer 504 measures energy of the despread symbols from the first Walsh despreader 502. An operation of the energy measurer 504 is well known in the art, so a detailed description will be avoided. The threshold comparator 505 compares a measured energy value from the energy measurer 504 with a predetermined threshold, and outputs a packet data control channel detection signal. As the result of comparison, if the measured energy value is greater than the threshold, the channel compensator 507 is enabled in response to the resultant signal from the threshold comparator 505. This means a case where the PPDCCH is received at high power, thus enabling demodulation of the PPDCCH. Otherwise, if the measured energy value is less than the threshold, the channel compensator 507 is disabled in response to the resultant signal from the threshold comparator 505. This means a case where the PPDCCH is not received or received with low reliability, thus disabling demodulation of the PPDCCH. As stated above, the first embodiment of the present invention first determines reception and reliability of the PPDCCH by the energy measurer 504 and the threshold comparator 505, and then demodulates the PPDCCH according to the determined result. In order to minimize a processing time, it is possible to perform the two processes in parallel.

A QPSK demodulator 508 QPSK-demodulates the channel compensated signal from the channel compensator 507 and outputs demodulated symbols. An inverse fast Hadamard transformer (IFHT) 509 performs inverse fast Hadamard transform on the demodulated symbols from the QPSK demodulator 508 in a unit of 4 symbols. The reason for performing the inverse fast Hadamard transform by the IFHT 509 is to search for a Walsh code used by the Walsh cover 202 of FIG. 2. That is, the signal output from the IFHT 509 in a unit of 4 symbols becomes correlations between the received signal and the 4 Walsh codes listed in Table 1. An energy measurer 510 measures energy of the correlations from the IFHT 509. Here, the energy measurement is performed for one slot where the PPDCCH is transmitted. The energy measurer 510 measures energy of the Walsh covers for the one slot. A comparator/selector 511 compares the measured energy values from the energy measurer 510, and selects subpacket length information corresponding to a Walsh cover having the greatest energy value. Here, the comparator/selector 511 includes the mapping table of Table 1, and reads from the mapping table a subpacket length corresponding to the Walsh cover having the greatest energy value. The comparator/selector 511 provides the Walsh cover (or Walsh code) having the greatest energy value to a Walsh decover section 512.

The Walsh decover section 512 decovers demodulated symbols from the QPSK demodulator 508 with the Walsh cover from the comparator/selector 511. A decoder 513 decodes the symbols from the Walsh decover 512 and outputs a 6-bit information bit stream corresponding to the MAC ID information. For example, a (12,6) block decoder is used for the decoder 513. Although FIG. 5 has been described with reference to the case where the MAC ID information is comprised of 6 bits, the same structure can also be applied to another case where the number of MAC ID information bits has a different value. For example, when the MAC ID information is comprised of 5 bits, the (12,6) block decoder used for the decoder 513 must be replaced with a (12,5) block decoder.

Figure 6:
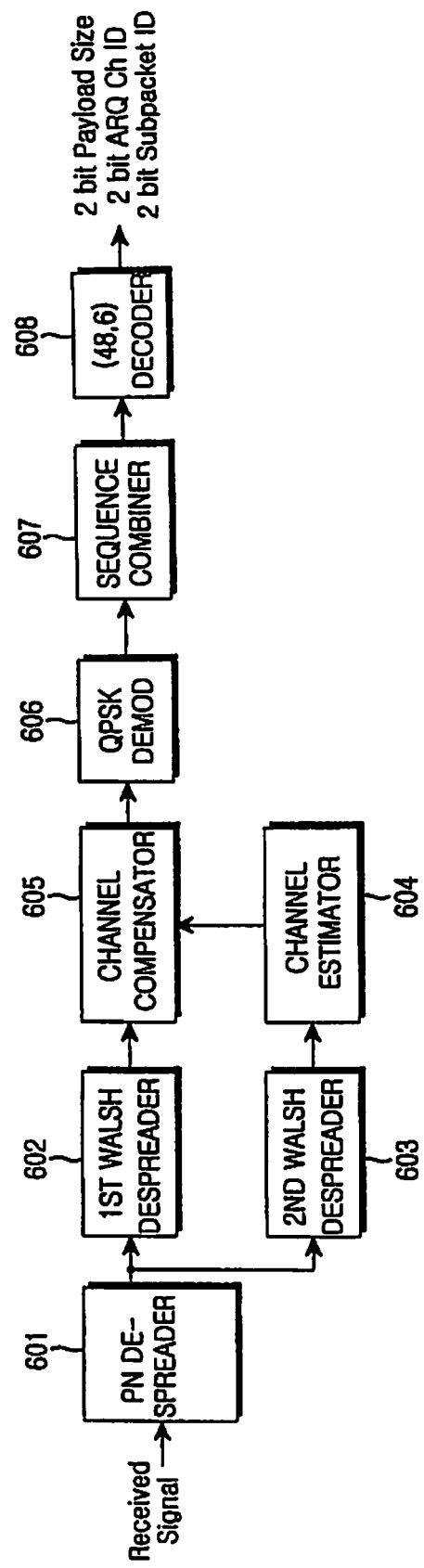
FIG. 6 illustrates a structure of a channel reception device for receiving the remaining control information excepting the MAC ID information and the subpacket length information according of the first embodiment of the present invention.

FIG. 6 illustrates a structure of a channel reception device for receiving the remaining control information excepting the MAC ID information and the subpacket length information according of the first embodiment of the present invention. The channel reception device of FIG. 6 has a structure corresponding to the channel transmission device of FIG. 3.

Referring to FIG. 6, a PN despreader 601 despreads a received signal with a specific PN code. A first Walsh despreader 602 despreads the PN-despread signal from the PN despreader 601 with a specific Walsh code used for transmission of the PPDCCH. A second Walsh despreader 603 despreads the PN-despread signal from the PN despreader 601 with a Walsh code for a pilot channel. A channel estimator 604 performs channel estimation using the pilot channel signal from the second Walsh spreader 603, and complex-conjugates the channel estimated signal into a channel compensated signal. The channel compensator 605 performs channel compensation by multiplying the signal from the first Walsh despreader 602 and the channel compensated signal from the channel estimator 604. A QPSK demodulator 606 QPSK-demodulates the channel compensated signal from the channel compensator 605 and outputs demodulated symbols. A sequence combiner 607 sequence-combines the decoded symbols from the QPSK demodulator 606 based on the repetition frequency of the sequences used in the transmitter. A decoder 608 decodes the demodulated symbols from the sequence combiner 607, and outputs the decoded remaining control information. For example, a (48,6) block decoder is used for the decoder 608. Here, the "remaining control information" may include the 2-bit payload size information, the 2-bit ARQ channel ID information and the 2-bit subpacket ID (SPID).

As described above, in the first embodiment of the present invention, the MAC ID information and the subpacket length information are transmitted over the PPDCCH, while the other control information needed for demodulation is transmitted over the SPDCCH. Here, the subpacket length information is transmitted by Walsh covering.

Figure 7:
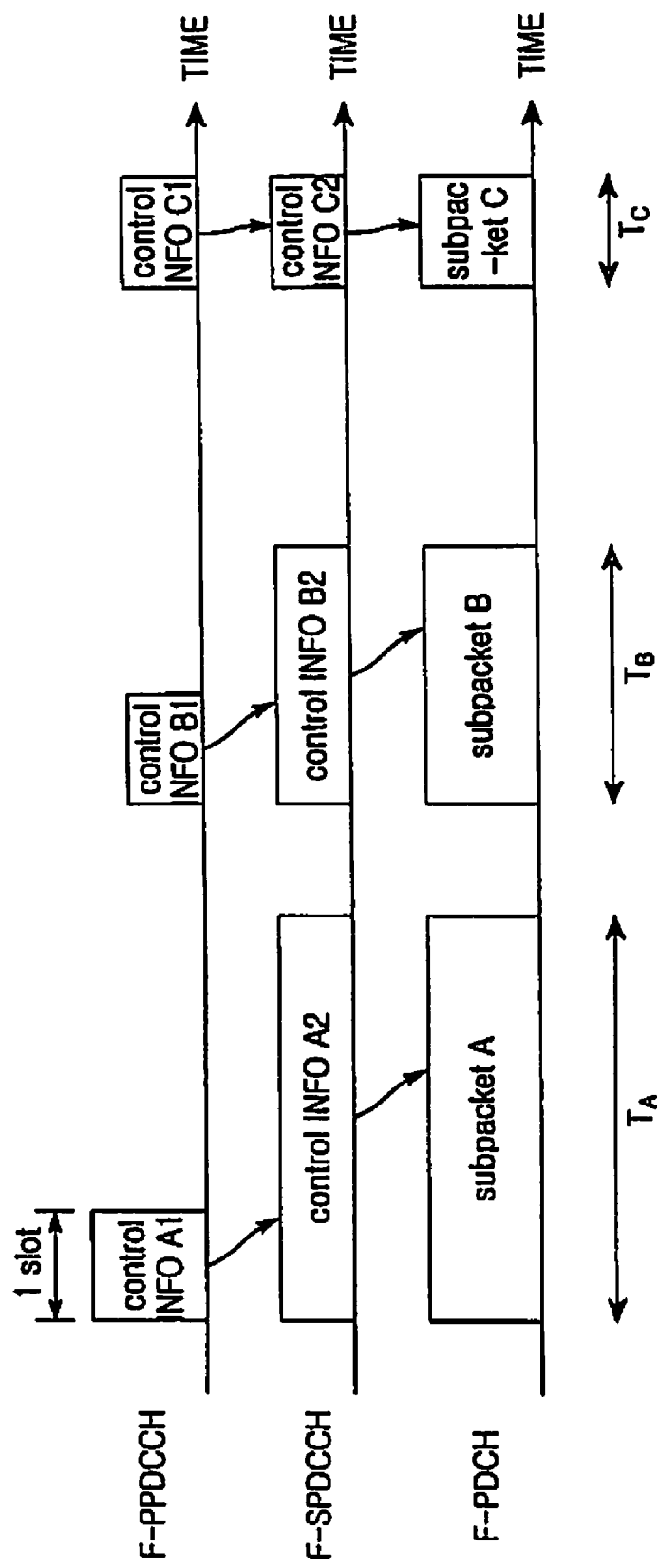
FIG. 7 illustrates a primary packet data control channel (PPDCCH), a secondary packet data control channel (SPDCCH) and a packet data channel (PDCH) on a time axis according to an embodiment of the present invention.

FIG. 7 illustrates a primary packet data control channel (PPDCCH), a secondary packet data control channel (SPDCCH) and a packet data channel (PDCH) on a time axis according to an embodiment of the present invention.

As illustrated in FIG. 7, the subpackets transmitted at the same time are represented by the same reference letters. The SPDCCH and the PDCH are transmitted for time durations $T_A$, $T_B$ and $T_C$, while the PPDCCH is transmitted for one slot regardless of a length of the time durations $T_A$, $T_B$ and $T_C$. Here, the time durations of the SPDCCH and the PDCH may occupy 1 slot, 2 slots, 4 slots or 8 slots according to the payload size and data rate of the packet data transmitted. The time durations where the SPDCCH is transmitted, are basically set equal to the time durations of the PDCH. However, the SPDCCH should be first received in order to demodulate and decode the PDCH. Thus, when the PDCH occupies two or more slots, the time durations of the SPDCCH may be set shorter than the time duration of the PDCH. For example, when the PDCH occupies 8 slots, the SPDCCH may occupy 4 slots. For the time durations $T_A$, $T_B$ and $T_C$, a process for receiving the PDCH is initiated by detecting PPDCCH of each time duration. After successfully detecting the PPDCCH, the terminal restores the MAC ID information and the PDCH subpacket length information included in the PPDCCH. If the received MAC ID information is identical to its own MAC ID information, the terminal restores the remaining control information by demodulating and decoding the SPDCCH, and then demodulates and decodes the PDCH using the control information. Since the PPDCCH, the SPDCCH and the PDCH are simultaneously received, the terminal should store the SPDCCH and the PDCH in a buffer during restoration of the PPDCCH, and store the PDCH in the buffer during restoration of the SPDCCH.

Figure 8:
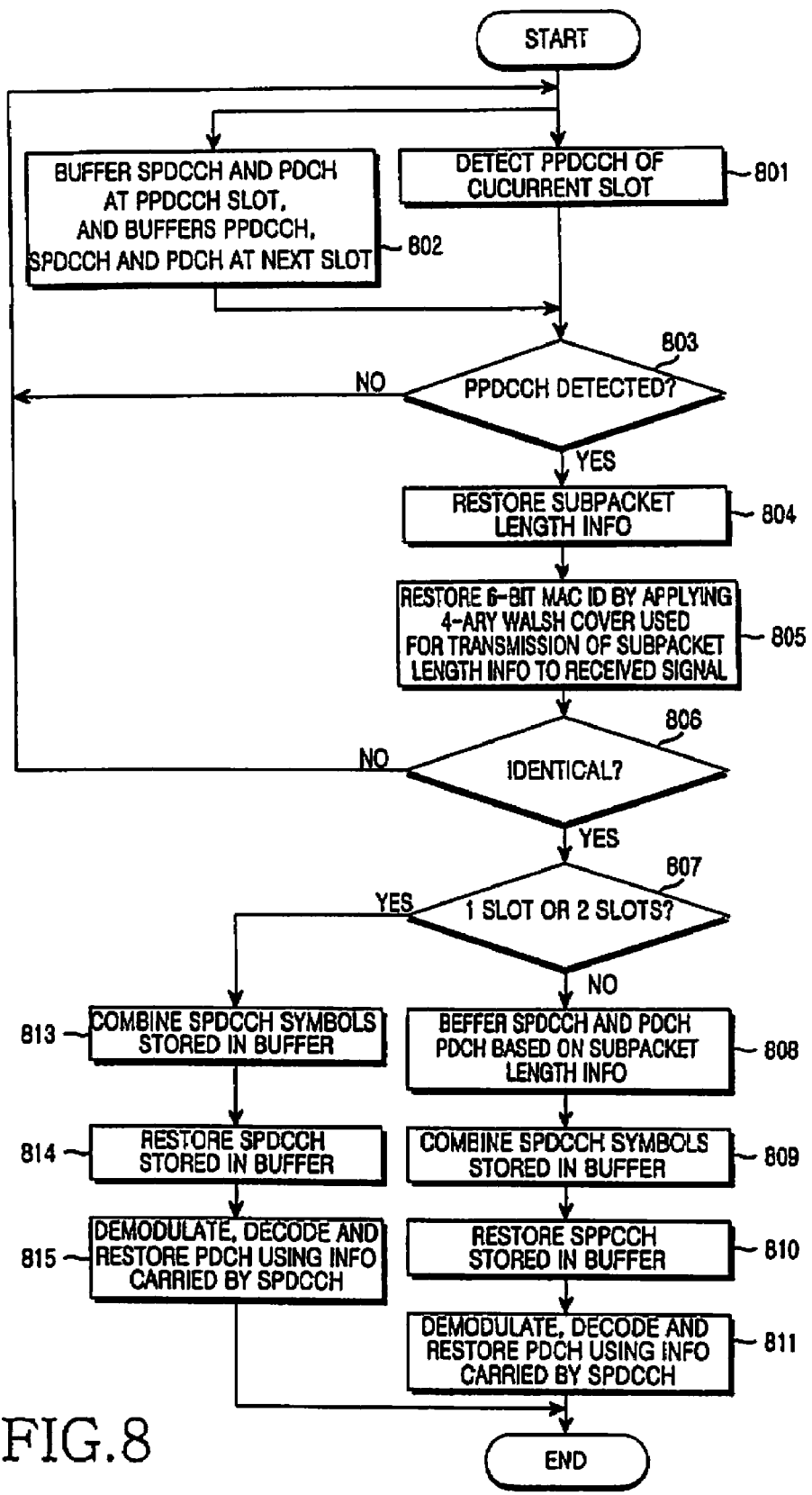
FIG. 8 illustrates a procedure for receiving PPDCCH, SPDCCH and PDCH by the mobile terminal according to an embodiment of the present invention.

FIG. 8 illustrates a procedure for receiving PPDCCH, SPDCCH and PDCH by the terminal according to an embodiment of the present invention. Referring to FIG. 8, the terminal detects PPDCCH from a current slot in step 801. As described in conjunction with FIGS. 4 and 5, the terminal can detect the PPDCCH by despreading a PN-despread signal with the Walsh code used for spreading of the PPDCCH and then measuring energy of the despread symbols. That is, it is necessary to perform energy detection over one-slot duration in order to detect the PPDCCH. Therefore, in order to secure a time required for receiving the PPDCCH and a time required for the energy detection, the terminal buffers the SPDCCH and the PDCH in a slot to which the PPDCCH belongs while performing the PPDCCH detection, and then buffers the PPDCCH, the SPDCCH and the PDCH in the next slot. The buffering is performed in step 802. The reason for performing the buffering is because upon detection of the PPDCCH, the terminal should restore the SPDCCH and the PDCH received along with the PPDCCH, and even upon failure to detect the PPDCCH, the terminal should perform the energy detection on the next slot.

After performing the DDPCCH detection, the terminal determines in step 803 whether a measured energy value of the PPDCCH exceeds a predetermined threshold, i.e., whether the PPDCCH is successfully received. If the measured energy value is greater than the threshold, the terminal determines that the PPDCCH is received. Otherwise, the terminal determines that the PPDCCH is not received. If it is determined that the PPDCCH is not received, the terminal returns to step 802 and performs energy detection on the buffered PPDCCH of the next slot. However, if it is determined that the PPDCCH is received, the terminal restores subpacket length information received over the PPDCCH in step 804. The subpacket length information, as described in conjunction with reference to FIGS. 4 and 5, can be searched by determining the Walsh cover (Walsh code) used, through inverse fast Hadamard transform and then consulting the mapping table of Table 1.

After restoring the subpacket length information, the terminal restoring the MAC ID information received over the PPDCCH using a Walsh cover of length 4 is calculated through the inverse fast Hadamard transform in step 805. After restoring the MAC ID information, the terminal compares the restored MAC ID information with its own MAC ID information in step 806. If the restored MAC ID information is not identical to its own MAC ID information, the terminal returns to step 801 and performs again energy detection on the buffered PPDCCH of the next slot. Otherwise, if the restored MAC ID information is identical to its own MAC ID information, the terminal recognizes that the received packet data channel is destined therefor, and then proceeds to step 807.

In step 807, the terminal analyzes the subpacket length information to determine whether a length of the subpacket in the packet data channel is 1 slot or 2 slots. If the length of the subpacket in the packet data channel exceeds 2 slots, the terminal additionally buffers the SPDCCH and the PDCH according to the length of the subpacket in step 808. For example, if the subpacket length is 4 and the SPDCCH and the PDCH occupy the same number of slots, the terminal additionally buffers the SPDCCH and the PDCH of the two remaining slots excepting the two slots of the previously buffered SPDCCH and PDCH. As a result, the terminal buffers the SPDCCH and the PDCH of a total of 4 slots.

After additionally performing the SPDCCH and the PDCH, the terminal performs despreading on the buffered SPDCCH and performs sequence combining on the symbols created through the despreading based on the repetition number used by the transmitter, in step 809. Thereafter, in step 810, the terminal restores the remaining control information excepting the MAC ID information and the subpacket length information by decoding the symbols created by the sequence combining. The remaining control information, as stated above, includes the payload size information, the ARQ channel ID information and the subpacket ID information. Thereafter, in step 811, the terminal demodulates and decodes the PDCH using the control information acquired by restoring the PPDCCH and the SPDCCH, thereby restoring the packet data.

If it is determined in step 807 that the length of the subpacket in the packet data channel is 1 slot or 2 slots, the above additional buffering is not performed. Therefore, in step 813, the terminal performs despreading on the buffered SPDCCH of the 1 slot or 2 slots, and performs sequence combining on the symbols created through the despreading based on the repetition number used in the transmitter. Thereafter, in step 814, the terminal restores the remaining control information excepting the MAC ID information and the subpacket length information by decoding the symbols created by the sequence combining. The remaining control information, as stated above, includes the payload size information, the ARQ channel ID information and the subpacket ID information. Thereafter, in step 815, the terminal demodulates and decodes the PDCH using the control information acquired by restoring the PPDCCH and the SPDCCH, thereby restoring the packet data.

Second Embodiment

Figure 9:
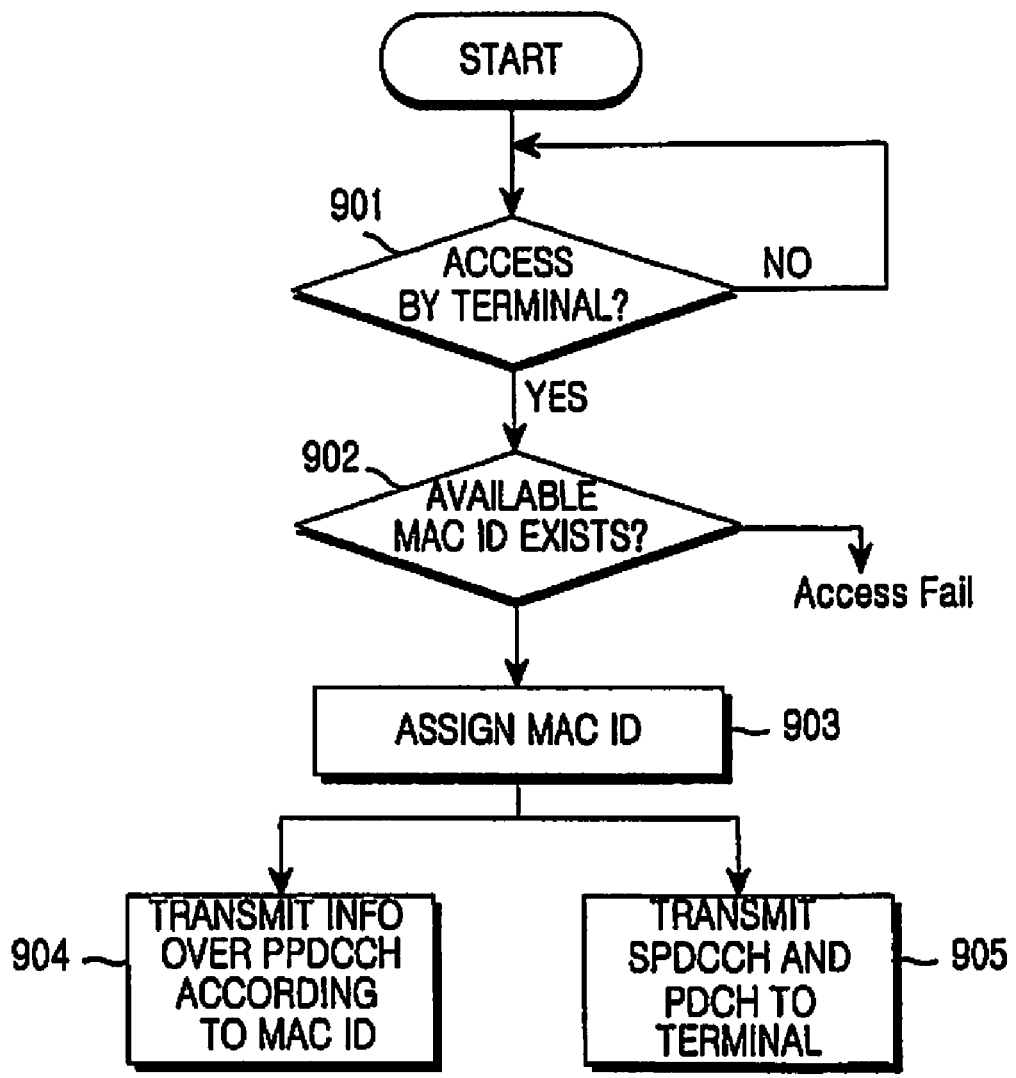
FIG. 9 illustrates a procedure for transmitting PPDCCH, SPDCCH and PDCH by a base station according to a second embodiment of the present invention.

FIG. 9 illustrates a procedure for transmitting PPDCCH, SPDCCH and PDCH by a base station according to a second embodiment of the present invention. Referring to FIG. 9, when a terminal desiring to receive a packet data service attempts an access in step 901, the base station determines in step 902 whether there exists available MAC ID information assignable to the terminal by consulting Table 3. If there exists no available MAC ID information, the base station performs an access fail process. Otherwise, if there exists available MAC ID information, the base station assigns one of the available MAC IDs to the terminal and then informs the terminal of the assigned MAC ID through a signaling message, in step 903. Being assigned the MAC ID, the terminal acquires information (Walsh function information, and information on a channel of the complex channels, to be used for transmission) on the PPDCCH to be received, using Table 2 or Table 3 previously agreed with the base station, and thereafter, detects the PPDCCH using the acquired information.

TABLE 2

| MAC ID | Using state | Walsh function assigned to PPDCCH | Transmission channel (I or Q channel) |
|---|---|---|---|
| 00000 | ○ | Walsh function No 48 of length 512 | In-Phase channel |
| 00001 | ○ | | Quadrature-phase channel |
| 00010 | X | Walsh function No 49 of length 512 | In-Phase channel |
| 00011 | ○ | | Quadrature-phase channel |
| 00100 | X | Walsh function No 50 of length 512 | In-Phase channel |
| 00101 | X | | Quadrature-phase channel |
| 00110 | ○ | Walsh function No 51 of length 512 | In-Phase channel |
| 00111 | X | | Quadrature-phase channel |
| . | . | . | . |
| . | . | . | . |
| . | . | . | . |

TABLE 3

| MAC ID | Using state | Walsh function assigned to PPDCCH | Transmission channel (I or Q channel) |
|---|---|---|---|
| 00000 | ○ | Walsh function No 48 of length 512 | In-Phase channel |
| 00001 | ○ | | Quadrature-phase channel |
| 00010 | X | | In-Phase channel |
| 00011 | ○ | | Quadrature-phase channel |
| 00100 | X | Walsh function No 49 of length 512 | In-Phase channel |
| 00101 | X | | Quadrature-phase channel |
| 00110 | ○ | | In-Phase channel |
| 00111 | X | | Quadrature-phase channel |
| . | . | . | . |
| . | . | . | . |
| . | . | . | . |

Table 2 and Table 3 illustrate memory tables required by the base station in assigning the MAC ID to the terminal desiring to receive the data service and managing the MAC ID information. Specifically Table 2 includes using state information indicating whether the MAC IDs are in use at a specific point of time, and also includes information on Walsh functions used for the PPDCCH according to the MAC IDs and information on a transmission channel of the complex channels, to be used for transmission. If the terminal to be provided with the service is determined by a scheduler, a Walsh function to be used for spreading of the PPDCCH is determined according to the MAC ID information of the terminal. After determination of the Walsh function, the base station selects one of the I (In-phase) channel and the Q (Quadrature-phase) channel, to transmit the PPDCCH through the selected channel. Namely, the Walsh function and the transmission channel are assigned to the MAC ID on a one-to-one basis (one-to-one mapping). Even though the same Walsh function is used, the base station can identify the MAC ID using the transmission channel (I or Q channel) information. This means that the base station can identify as many terminals as twice the number of the Walsh functions assigned to the PPDCCH. For example, when 16 Walsh functions are assigned to the PPDCCH, the base station can identify 32 terminals, which means that the base station can assign a total of 32 MAC IDs.

Meanwhile, Table 3 is used when transmitting twice the MAC ID through the PPDCCH and the SPDCCH. As illustrated in Table 3, the same Walsh function and the same transmission channel are mapped to a plurality of MAC IDs (e.g., 2 MAC IDs) (multiple-to-one mapping). Therefore, if the base station transmits the PPDCCH using the Walsh function and transmission channel corresponding to a specific MAC ID, then not only the terminal but also another terminal will demodulate the SPDCCH. In this case, the terminals determine whether the received packet is their own packet or another terminal's packet, by analyzing the MAC ID included in the SPDCCH.

Turning back to FIG. 9, after assigning the MAC ID information to the terminal, the base station acquires information (Walsh function and transmission channel) needed for transmitting the PPDCCH from Table 2 or Table 3. Thereafter, in step 904, the base station transmits the subpacket length information corresponding to a transmission length of the PDCH through the PPDCCH. At that moment, the base station transmits the subpacket length information through the acquired transmission channel (I channel or Q channel), and performs channel spreading using the determined Walsh function. Meanwhile, the base station transmits the SPDCCH and the PDCH in step 905. At that moment, the base station determines a sequence repetition number of the SPDCCH and the PDCH according to the subpacket length information by consulting Table 4 below, and repeats the coded symbols transmitted over the SPDCCH and the PDCH according to the determined sequence repetition number.

TABLE 4

| Subpacket length information | Transmission length of SPDCCH | Transmission length of PDCH |
|---|---|---|
| 00 | 1 | 1 |
| 01 | 2 | 2 |
| 10 | 4 | 4 |
| 11 | 4 | 8 |

Figure 10:
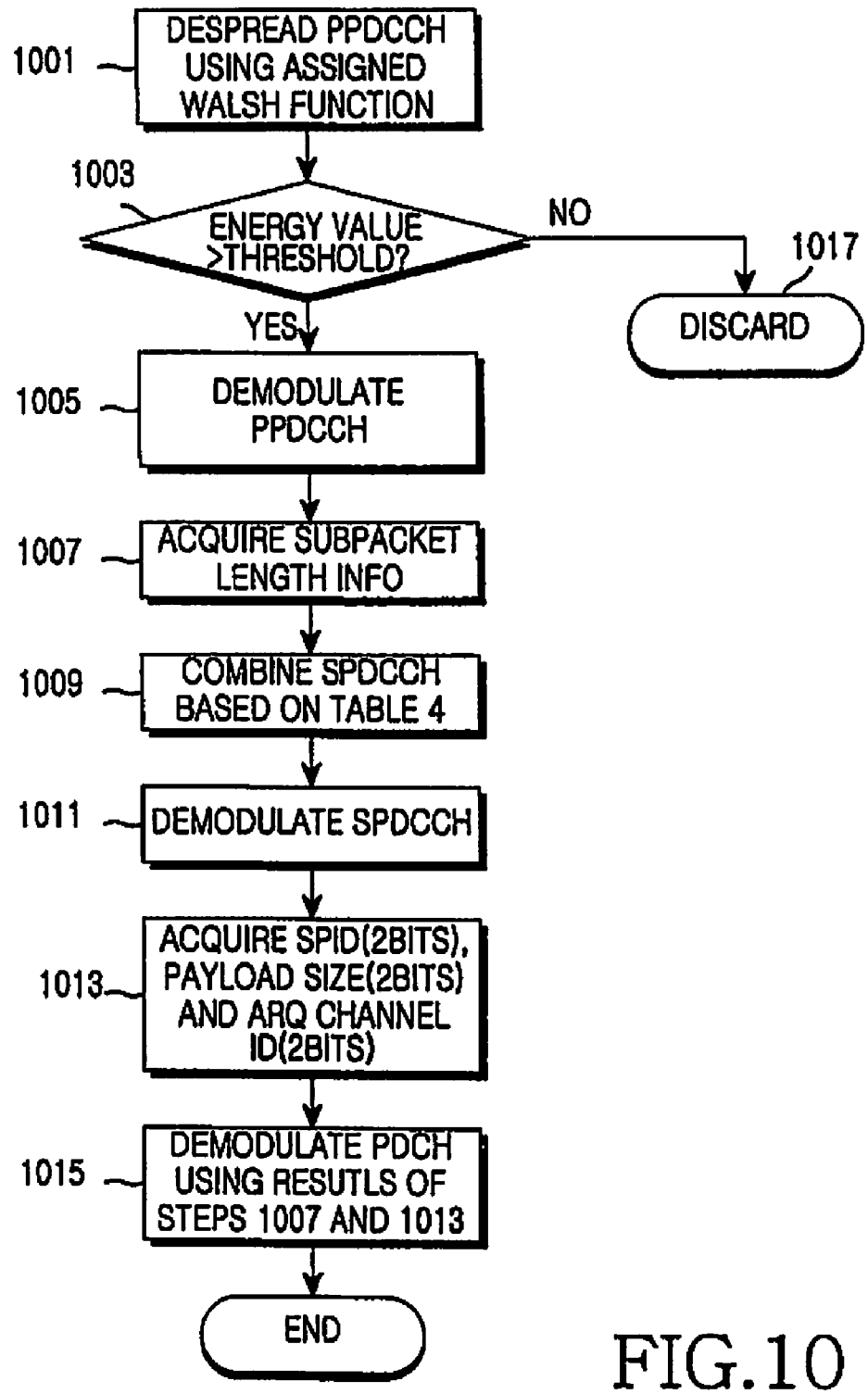
FIG. 10 illustrates a procedure for receiving PPDCCH, SPDCCH and PDCH by a terminal according to the second embodiment of the present invention.

FIG. 10 illustrates a procedure for receiving PPDCCH, SPDCCH and PDCH by the terminal according to the second embodiment of the present invention. Specifically, FIG. 10 illustrates an operation of a reception device of FIGS. 13 and 14, which corresponds to an operation of a transmission device of FIGS. 11 and 12. First, the terminal is assigned a MAC ID from the base station and determines a Walsh function and a transmission channel for demodulating the PPDCCH using the assigned MAC ID by consulting Table 2.

Referring to FIG. 10, in step 1001, the terminal obtains symbols of the PPDCCH by multiplying a PN-despread signal received through the determined transmission channel (I channel or Q channel) by the determined Walsh function, for despreading. In step 1003, the terminal measures energy of the obtained symbols and determines whether the measured energy value exceeds a predetermined threshold, i.e., whether the PPDCCH is received. It is necessary to perform energy measurement over a one-slot duration in order to determine whether the PPDCCH is received. Therefore, in order to secure a time required for receiving the PPDCCH and a time required for the energy measurement, the terminal buffers the SPDCCH and the PDCH in a slot which the PPDCCH is included while performing the PPDCCH detection, and then buffers all of the PPDCCH, the SPDCCH and the PDCH in the next slot. The reason for performing the buffering is because upon detection of the PPDCCH, the terminal should restore the SPDCCH and the PDCH received along with the PPDCCH, and even upon failure to detect the PPDCCH, the terminal should perform the energy detection on the next slot.

If the measured energy value exceeds the threshold, the terminal proceeds to step 1005. Otherwise, the terminal proceeds to step 1017 where it discards the SPDCCH and the PDCH buffered after being received along with the PPDCCH, and then performs energy detection on the buffered PPDCCH of the next slot. Since the base station uses a specific Walsh function uniquely assigned to a corresponding terminal during spreading of the PPDCCH, other terminals except for the corresponding terminal may fail to detect energy in step 1003. If the measured energy value exceeds the threshold in step 1003, the terminal recognizes that the currently received packet data is its own data destined therefor. Thereafter, the terminal demodulates and decodes the PPDCCH in step 1005, and acquires subpacket length information received over the PPDCCH in step 1007.

In step 1009, the terminal determines a transmission length (or sequence repetition number N) of the SPDCCH using the acquired subpacket length information by consulting Table 4. If the transmission length exceeds 2 slots, the terminal additionally buffers the SPDCCH and the PDCH according to the subpacket length. For example, if the subpacket length is 4 and the SPDCCH and the PDCH occupy the same number of slots, the terminal additionally buffers the SPDCCH and the PDCH of the remaining 2 slots except for the two slots of the previously buffered SPDCCH and PDCH. As a result, the terminal buffers the SPDCCH and the PDCH of a total of 4 slots. In step 1009, the terminal despreads the buffered SPDCCH and sequence-combines the symbols created through the despreading based on the sequence repetition number.

Thereafter, the terminal decodes the symbols created by the sequence combining in step 1011, and acquires the remaining control information except for the MAC ID information and the subpacket length information in step 1013. Here, the "remaining control information" may include the subpacket ID information, the payload size information and the ARQ channel ID information. Thereafter, in step 1015, the terminal demodulates the PDCH using the control information acquired by demodulating the PPDCCH and the SPDCCH.

Figure 11:
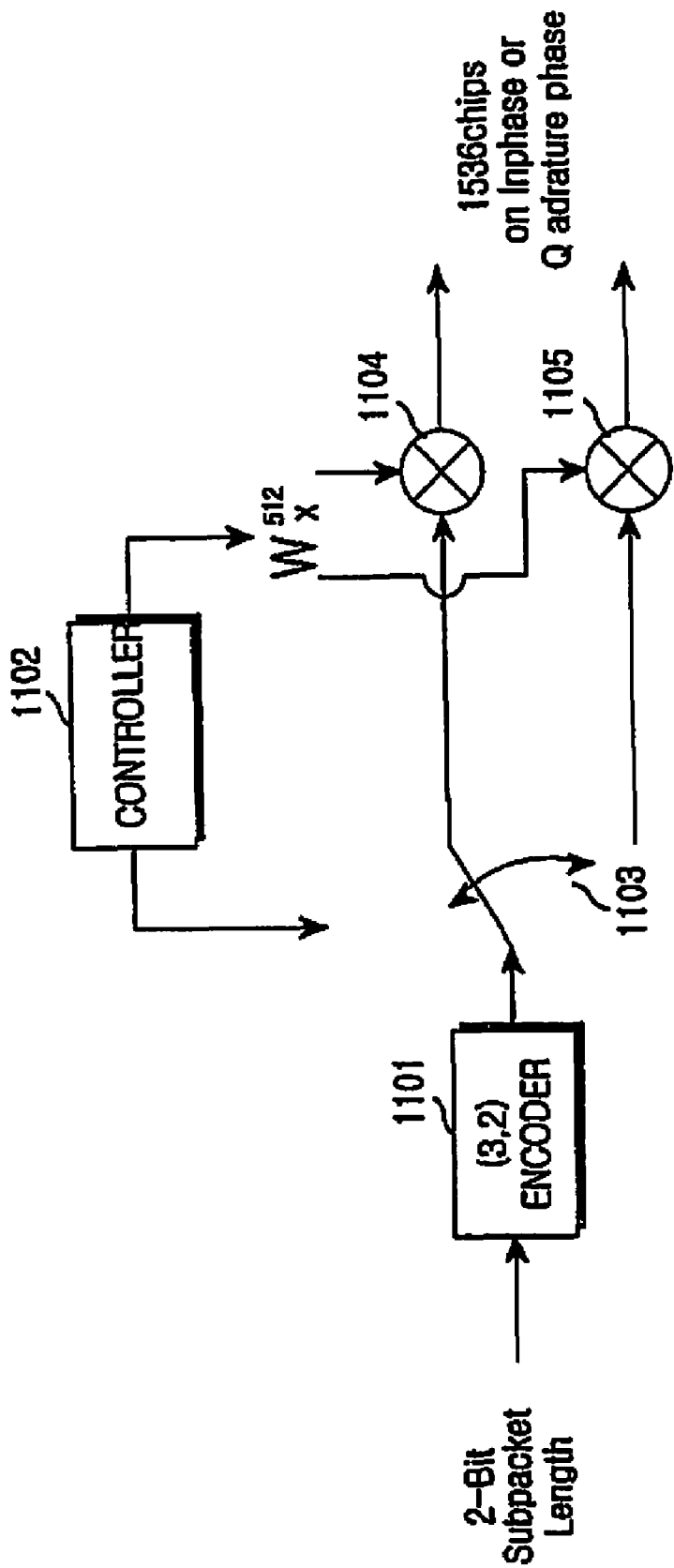
FIG. 11 illustrates a structure of a channel transmission device for transmitting MAC ID information and subpacket length information by a base station according to the second embodiment of the present invention.

FIG. 11 illustrates a structure of a channel transmission device for transmitting MAC ID information and subpacket length information by a base station according to the second embodiment of the present invention. Referring to FIG. 11, an encoder 1101 encodes subpacket length information into coded symbols. For example, a (3,2) block encoder for block-encoding 2-bit subpacket length information into 3 output symbols can be used for the encoder 1101. A controller 1102 controls an I/Q channel switch 1103 and Walsh spreaders 1104 and 1105 using Table 2. The switch 1103, under the control of the controller 1102, switches the symbols from the encoder 1101 to an I channel (first output line) or a Q channel (second output line). When the switch 1103 is connected to the first output line, the Walsh spreaders 1104 connected to the first output line multiplies the symbols on the first output line by a Walsh function of length 512 from the controller 1102, for spreading, and outputs 1,536 chips per slot. When the switch 1103 is connected to the second output line, the Walsh spreader 1105 connected to the second output line multiplies the symbols on the second output line by the Walsh function of length 512, for spreading, and outputs 1,536 chips per slot. As mentioned above, the PPDCCH transmitter spreads the coded symbols corresponding to the subpacket length information with a Walsh function based on the MAC ID information, and transmits the spread coded symbols through a specific transmission channel (I channel or Q channel).

Figure 12:
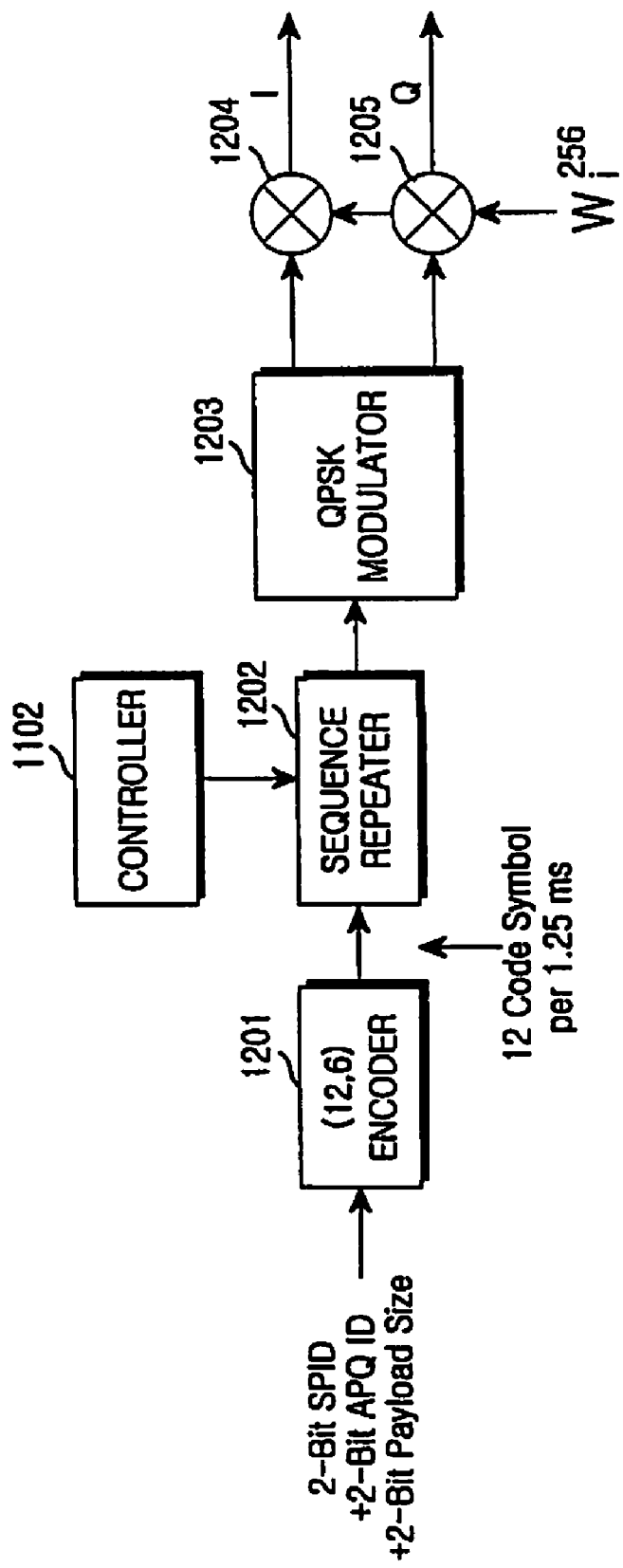
FIG. 12 illustrates a structure of a channel transmission device for transmitting the remaining control information excepting the MAC ID information and subpacket length information by a base station according to the second embodiment of the present invention.

FIG. 12 illustrates a structure of a channel transmission device for transmitting the remaining control information excepting the MAC ID information and subpacket length information by a base station according to the second embodiment of the present invention. As illustrated, the "remaining control information" may include payload size information, ARQ channel ID information and subpacket ID information. Referring to FIG. 12, an encoder 1201 encodes an information bit stream of the remaining control information into coded symbols. For example, a (12,6) block encoder for block-encoding a 6-bit information bit stream into 12 output symbols can be used for the encoder 1201. The controller 1102 controls a sequence repetition number of a sequence repeater 1202 based on the subpacket length information. The sequence repeater 1202, under the control of the controller 1102, sequence-repeats the coded symbols from the encoder 1201 a predetermined number of times. A QPSK modulator 1203 QPSK-modulates the coded symbols from the sequence repeater 1202 into a complex signal comprised of an I-channel signal and a Q-channel signal. Walsh spreaders 1204 and 1205 multiply the complex signal from the QPSK modulator 1203 by a Walsh function of length 256 assigned to the SPDCCH, for spreading. Thereafter, the Walsh-spread signal is PN-spread and converted into a radio frequency. The radio frequency is transmitted through an antenna.

Figure 13:
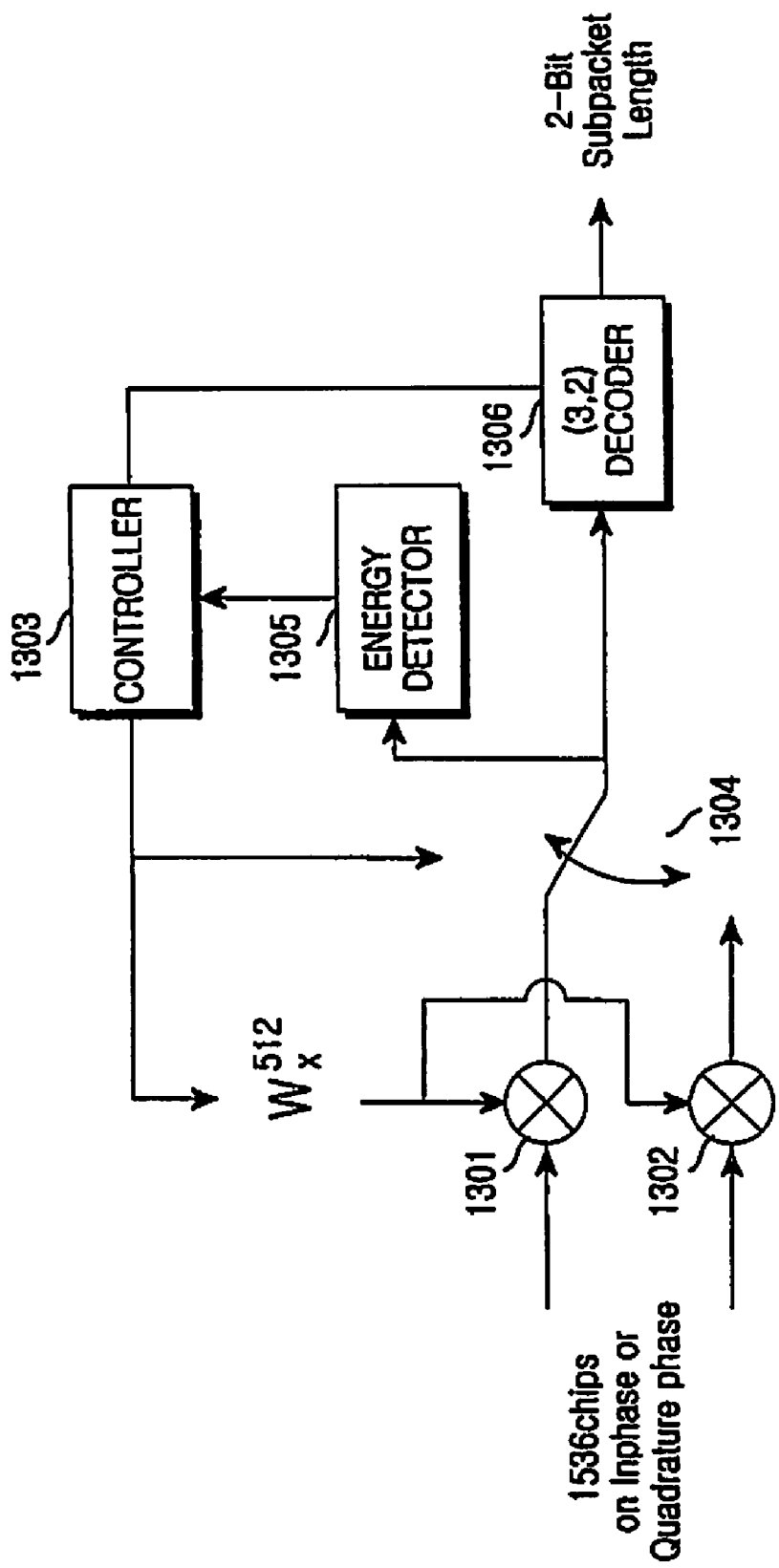
FIG. 13 illustrates a structure of a channel reception device for receiving the MAC ID information and the subpacket length information by a terminal according to the second embodiment of the present invention.

FIG. 13 illustrates a structure of a channel reception device for receiving the MAC ID information and the subpacket length information by a terminal according to the second embodiment of the present invention. The channel reception device of FIG. 13 has a structure corresponding to the channel transmission device of FIG. 11.

Referring to FIG. 13, a controller 1303 reads a Walsh function corresponding to a MAC ID assigned by the base station from Table 2 and provides the read Walsh function to Walsh despreaders 1301 and 1302. Further, the controller 1303 controls a switching operation of a switch 1304 by reading transmission channel information from Table 2. The despreaders 1301 and 1302 despread 1,536 chips received for one slot with a Walsh function of length 512 determined by the controller 1303, and outputs 3 coded symbols. The switch 1304 is switched by the controller 1303, thus to provide outputs of the despreader 1301 or 1302 to an energy detector 1305 and a decoder 1306. The energy detector 1305 measures energy of the symbols from the switch 1304, and outputs the measured energy value to the controller 1303. The controller 1303 determines whether the measured energy value exceeds a predetermined threshold. If the measured energy value is greater than the threshold, the controller 1303 enables the decoder 1306. However, if the measured energy value is less than the threshold, the controller 1303 disables the decoder 1306. The decoder 1306, under the control of the controller 1303, decodes the symbols from the switch 1304 and outputs the subpacket length information. The subpacket length information is provided to the controller 1303. For example, a (3,2) block decoder for block-decoding 3 input symbols and outputting 2 information bits can be used for the decoder 1306.

Figure 14:
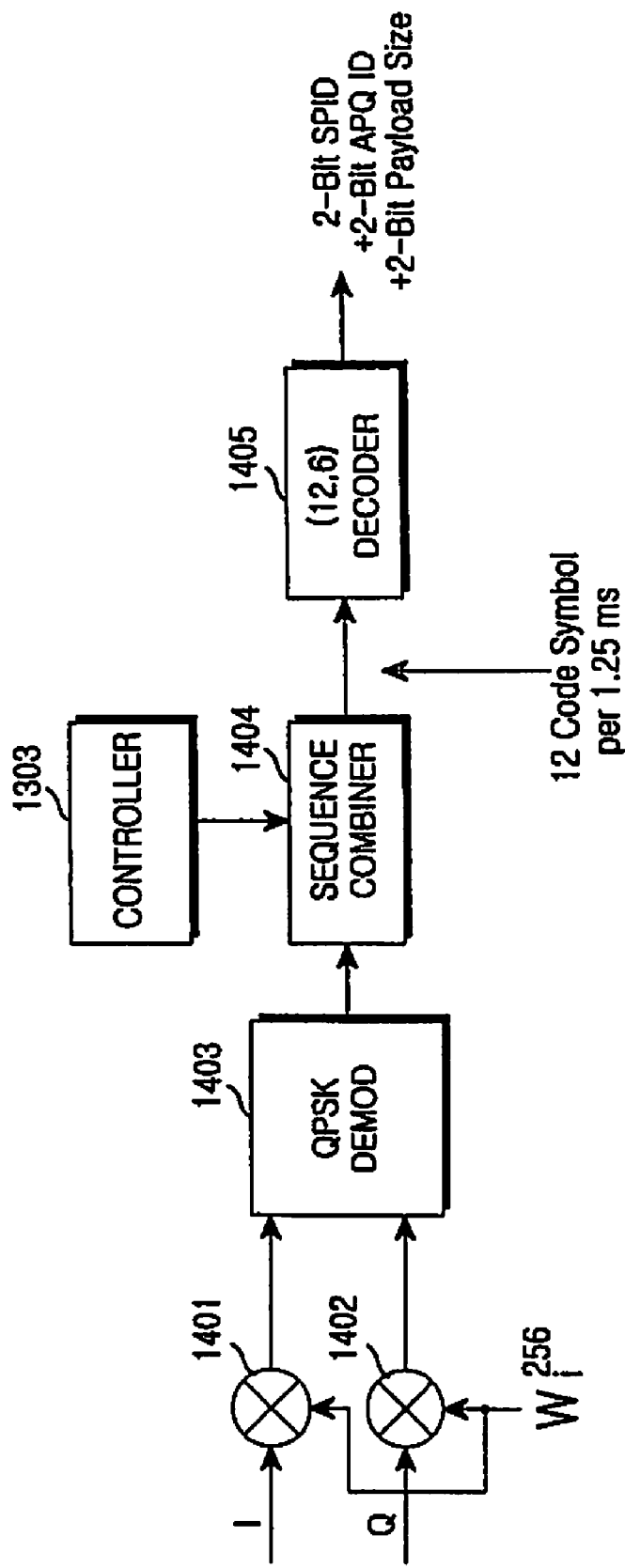
FIG. 14 illustrates a structure of a channel reception device for receiving the remaining control information excepting the MAC ID information and the subpacket length information by a terminal according to the second embodiment of the present invention.

FIG. 14 illustrates a structure of a channel reception device for receiving the remaining control information excepting the MAC ID information and the subpacket length information by a terminal according to the second embodiment of the present invention. The channel reception device of FIG. 14 has a structure corresponding to the channel transmission device of FIG. 12. The channel reception device of FIG. 14 is enabled when the measured energy value of the PPDCCH detected by the energy detector 1305 of FIG. 13 is greater than the threshold.

Referring to FIG. 14, despreaders 1401 and 1402 multiply received PN-despread signals by a Walsh function of length 256 used for Walsh spreading of the SPDCCH, for spreading, and output 6 symbols per slot. A QPSK demodulator 1403 QPSK-demodulates the 6 symbols from the despreaders 1401 and 1402, and outputs 12 demodulated symbols per slot. The controller 1303 receives the subpacket length information from the PPDCCH reception device of FIG. 13, and determines a sequence repetition number N indicating the number of slots over which the SPDCCH is transmitted, i.e., how many times the sequence has been repeated, by consulting Table 4 based on the subpacket length information. Further, the controller 1303 controls a sequence combiner 1404 based on the sequence repetition number N. The sequence combiner 1404, under the control of the controller 1303, generates 12 coded symbols by combining the demodulated symbols from the QPSK demodulator 1403. A decoder 1405 decodes the 12 coded symbols from the sequence combiner 1404 and outputs the remaining control information. For example, a (12,6) block decoder for block-decoding 12 coded symbols received and generating a 6-bit information bit stream can be used for the decoder 1405. Here, the "remaining control information" may include 2-bit payload size information, 2-bit subpacket ID information and 2-bit ARQ channel ID information. The control information acquired in this manner is used in demodulating the PDCH later.

As described above, the second embodiment of the present invention transmits the MAC ID information and the subpacket length information over the PPDCCH and the remaining control information over the SPDCCH. Here, the coded symbols of the PDCCH are transmitted after being spread with a unique Walsh code based on the MAC ID information.

Third Embodiment

Figure 15:
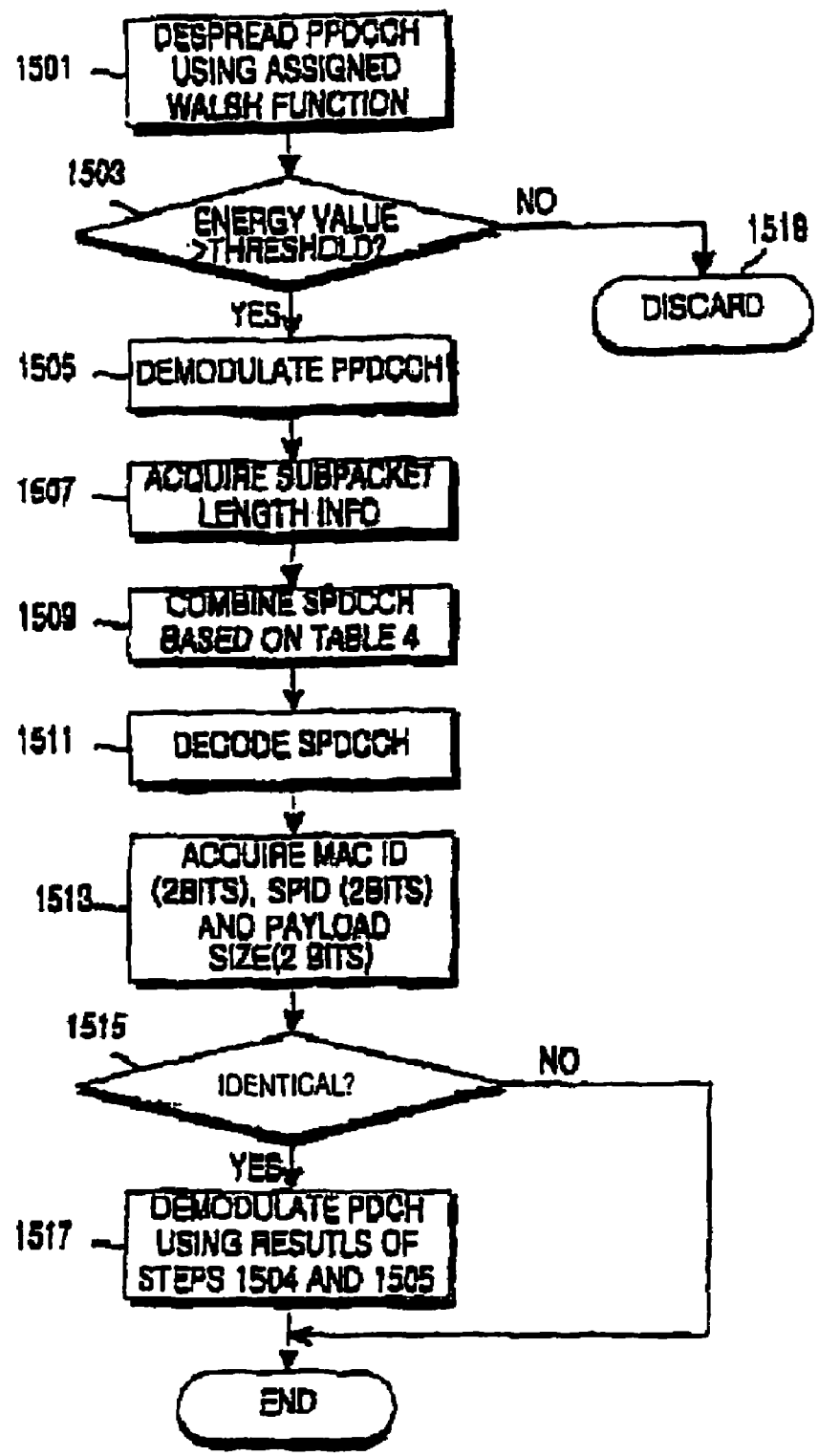
FIG. 15 illustrates a procedure for receiving PPDCCH, SPDCCH and PDCH by a terminal according to a third embodiment of the present invention.

FIG. 15 illustrates a procedure for receiving PPDCCH, SPDCCH and PDCH by a terminal according to a third embodiment of the present invention. That is, FIG. 15 illustrates an operation of the channel reception devices of FIGS. 18 and 19, which correspond to the transmission devices of FIGS. 16 and 17. First, the terminal is assigned a MAC ID from the base station and determines a Walsh function for demodulating the PPDCCH and a transmission channel by consulting Table 3, using the assigned MAC ID information.

Referring to FIG. 15, in step 1501, the terminal acquires symbols of the PPDCCH by multiplying the PN-despread signal received over the determined transmission channel (I channel or Q channel) by the determined Walsh function for despreading. In step 1503, the terminal measures energy of the acquired symbols and determines whether the measured energy value exceeds a predetermined threshold, i.e., whether the PPDCCH is received. Here, it is necessary to perform energy detection over a one-slot duration in order to detect reception of the PPDCCH. Therefore, in order to secure a time required for receiving the PPDCCH and a time required for the energy detection, the terminal buffers the SPDCCH and the PDCH in a slot to which the PPDCCH belongs while performing the PPDCCH detection, and then buffers all of the PPDCCH, the SPDCCH and the PDCH in the next slot. The reason for performing the buffering is because upon detection of the PPDCCH, the terminal should restore the SPDCCH and the PDCH received along with the PPDCCH, and even upon failure to detect the PPDCCH, the terminal should perform the energy detection on the next slot.

If the measured energy value exceeds the threshold, the terminal proceeds to step 1505. Otherwise, the terminal proceeds to step 1519 where it discards the SPDCCH data and the PDCH data buffered after being received along with the PPDCCH, and then performs energy detection on the buffered PPDCCH of the next slot. Since the base station uses a specific Walsh function uniquely assigned to a corresponding user during spreading of the PPDCCH, other terminals assigned no Walsh function may fail to detect energy in step 1503. That is, only the terminals using the same Walsh function will detect the energy in accordance with Table 3. If the measured energy value exceeds the threshold in step 1503, the terminal recognizes that the currently received packet data is its own data. Therefore, the terminal demodulates the PPDCCH in step 1505, and acquires subpacket length information received over the PPDCCH in step 1507.

In step 1509, the terminal determines a transmission length (or sequence repetition number N) of the SPDCCH using the acquired subpacket length information by consulting Table 3. If the transmission length exceeds 2 slots, the terminal additionally buffers the SPDCCH and the PDCH according to the subpacket length. For example, if the subpacket length is 4 and the SPDCCH and the PDCH occupy the same number of slots, the terminal additionally buffers the SPDCCH and the PDCH of the remaining 2 slots except for the two slots of the previously buffered SPDCCH and PDCH. As a result, the terminal buffers the SPDCCH and the PDCH of a total of 4 slots. In step 1509, the terminal despreads the buffered SPDCCH and sequence-combines the symbols created through the despreading based on the sequence repetition number. Thereafter, the terminal decodes the symbols created by the sequence combining in step 1511, and acquires the remaining control information except for the subpacket length information in step 1513. Here, the "remaining control information" may include the MAC ID information, the subpacket ID information, the payload size information and the ARQ channel ID information. Thereafter, in step 1515, the terminal determines whether the MAC ID among the acquired control information is identical to a MAC ID previously assigned from the base station. If the MAC ID is not identical to the previously assigned MAC ID, the terminal discards the buffered PDCCH, SPDCCH and PDCH, judging that the currently received data is not its own data. If, however, the acquired MAC ID is identical to the MAC ID assigned from the base station, the terminal demodulates the PDCH buffered for the subpacket length using the subpacket length information, subpacket ID information, payload size information and ARQ channel ID information, acquired in steps 1507 and 1513, judging that the currently received data is its own data.

Figure 16:
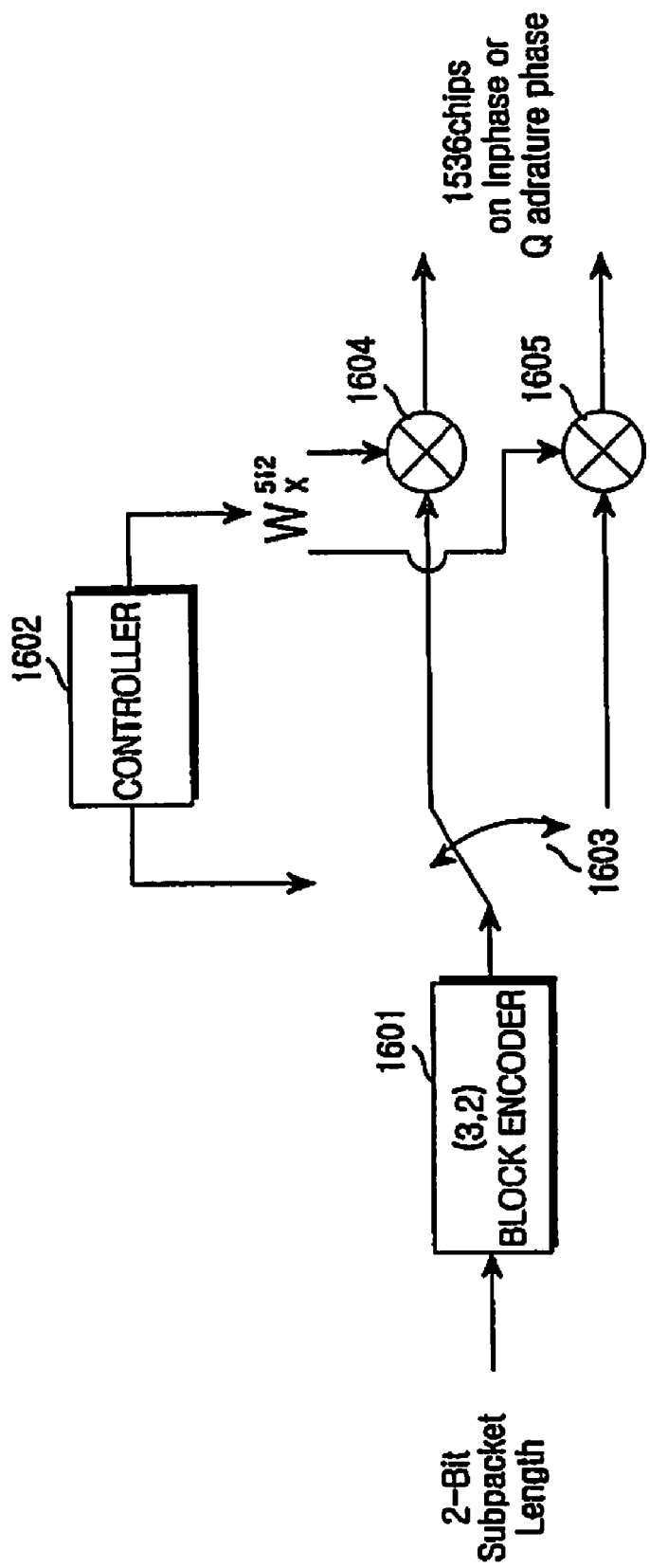
FIG. 16 illustrates a structure of a channel transmission device for transmitting subpacket length information by a base station according to the third embodiment of the present invention.

FIG. 16 illustrates a structure of a channel transmission device for transmitting subpacket length information by a base station according to the third embodiment of the present invention. Referring to FIG. 16, an encoder 1601 encodes subpacket length information into coded symbols. For example, a (3,2) block encoder for block-encoding 2-bit subpacket length information into 3 output symbols can be used for the encoder 1601. A controller 1602 controls an I/Q channel switch 1603 and Walsh spreaders 1604 and 1605 using Table 3. The switch 1603, under the control of the controller 1602, switches the symbols from the encoder 1601 to the I channel (first output line) or the Q channel (second output line). The Walsh spreaders 1604 and 1605 multiply the symbols from the switch 1603 by a Walsh function of length 512 from the controller 1602, for spreading, and outputs 1,536 chips per slot. As mentioned above, the PPDCCH transmitter spreads the coded symbols corresponding to the subpacket length information with a Walsh function based on the MAC ID information, and transmits the spread coded symbols through a specific transmission channel (I channel or Q channel). The transmission device is different from the transmission device of FIG. 11 in that the Walsh function and the transmission channel are not associated with one MAC ID, but a plurality of MAC IDs. That is, the second embodiment of the present invention determines whether the received packet data is its own packet data by simply demodulating the PPDCCH, whereas the third embodiment of the present invention determines whether the received packet data is its own data by demodulating up to the SPDCCH and analyzing the MAC ID.

Figure 17:
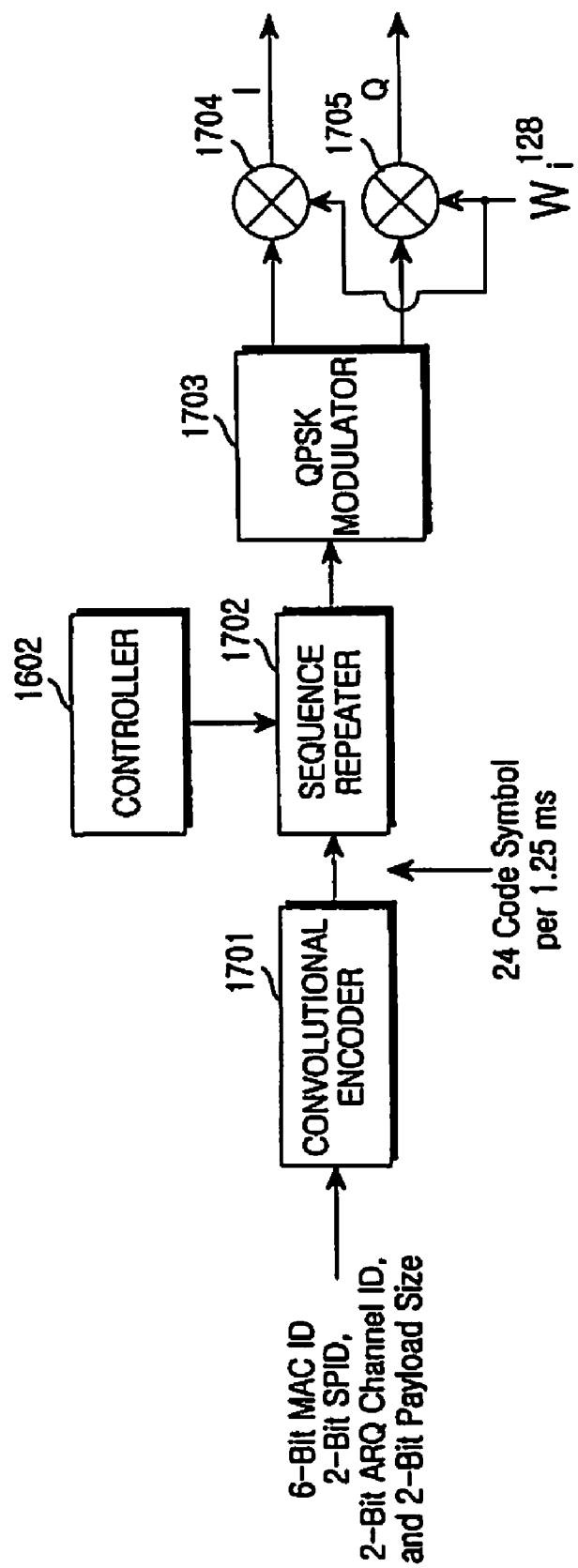
FIG. 17 illustrates a structure of a channel transmission device for transmitting the remaining control information excepting the subpacket length information by a base station according to the third embodiment of the present invention.

FIG. 17 illustrates a structure of a channel transmission device for transmitting the remaining control information excepting the subpacket length information by a base station according to the third embodiment of the present invention. As illustrated, the "remaining control information" may include MAC ID information, payload size information, ARQ channel ID information and subpacket ID information.

Referring to FIG. 17, a convolutional encoder 1701 convolutional-encodes an information bit stream of the remaining control information into coded symbols. For example, an R=½, K=9 convolutional encoder is used for the convolutional encoder 1701. Therefore, the encoder 1701 receives 12 information bits and provides 24 output symbols. The controller 1602 controls a sequence repetition number of a sequence repeater 1702 based on the subpacket length information. The sequence repeater 1702, under the control of the controller 1602, sequence-repeats the 24 symbols from the encoder 1701 a predetermined number of times. A QPSK modulator 1703 QPSK-modulates the coded symbols from the sequence repeater 1702 and outputs a complex signal comprised of an I-channel signal and a Q-channel signal. Walsh spreaders 1704 and 1705 multiply the complex signal from the QPSK modulator 1703 by a Walsh function of length 128 assigned to the SPDCCH, for Walsh spreading. Thereafter, the Walsh-spread signal is PN-spread and converted into a radio frequency. The radio frequency is transmitted through an antenna.

Figure 18:
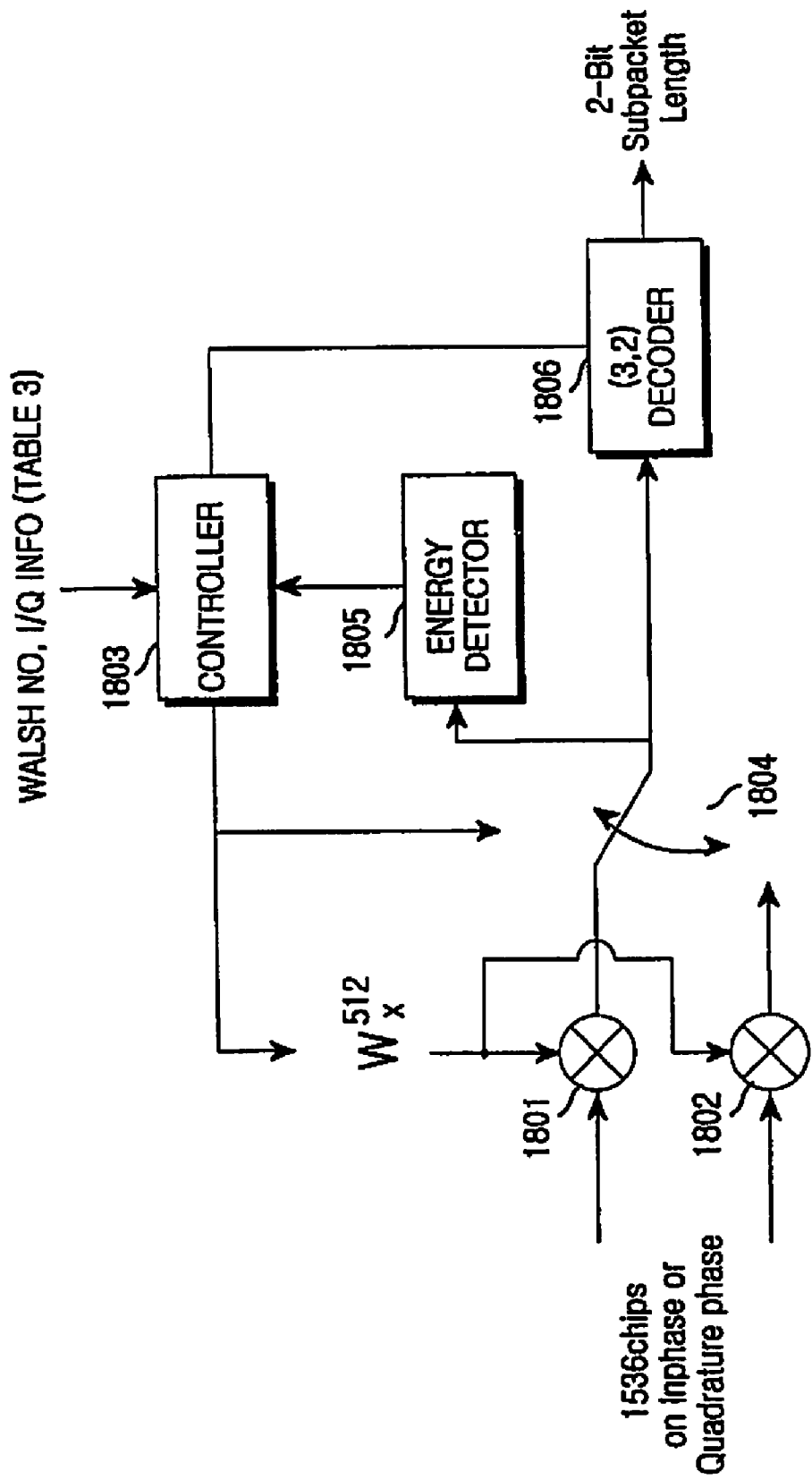
FIG. 18 illustrates a structure of a channel reception device for receiving the subpacket length information by a terminal according to the third embodiment of the present invention.

FIG. 18 illustrates a structure of a channel reception device for receiving the subpacket length information by a terminal according to the third embodiment of the present invention. The channel reception device of FIG. 18 has a structure corresponding to the channel transmission device of FIG. 16.

Referring to FIG. 18, a controller 1803 reads a Walsh function corresponding to a MAC ID assigned by the base station from Table 3 and provides the read Walsh function to Walsh despreaders 1801 and 1802. Further, the controller 1803 controls a switching operation of a switch 1804 by reading transmission channel information from Table 3. The despreaders 1801 and 1802 despread 1,536 chips received for one slot with a Walsh function of length 512 determined by the controller 1803, and outputs 3 coded symbols. The switch 1804 is switched by the controller 1803, thus to provide outputs of the despreader 1801 or 1802 to an energy detector

1805 and a decoder 1806. The energy detector 1805 measures energy of the symbols from the switch 1804, and outputs the measured energy value to the controller 1803. The controller 1803 determines whether the measured energy value exceeds a predetermined threshold. If the measured energy value is greater than the threshold, the controller 1803 enables the decoder 1806. However, if the measured energy value is less than the threshold, the controller 1803 disables the decoder 1806. The decoder 1806, under the control of the controller 1803, decodes the symbols from the switch 1804 and outputs the subpacket length information. The subpacket length information is provided to the controller 1803. For example, a (3,2) block decoder for block-decoding 3 input symbols and outputting 2 information bits can be used for the decoder 1806.

Figure 19:
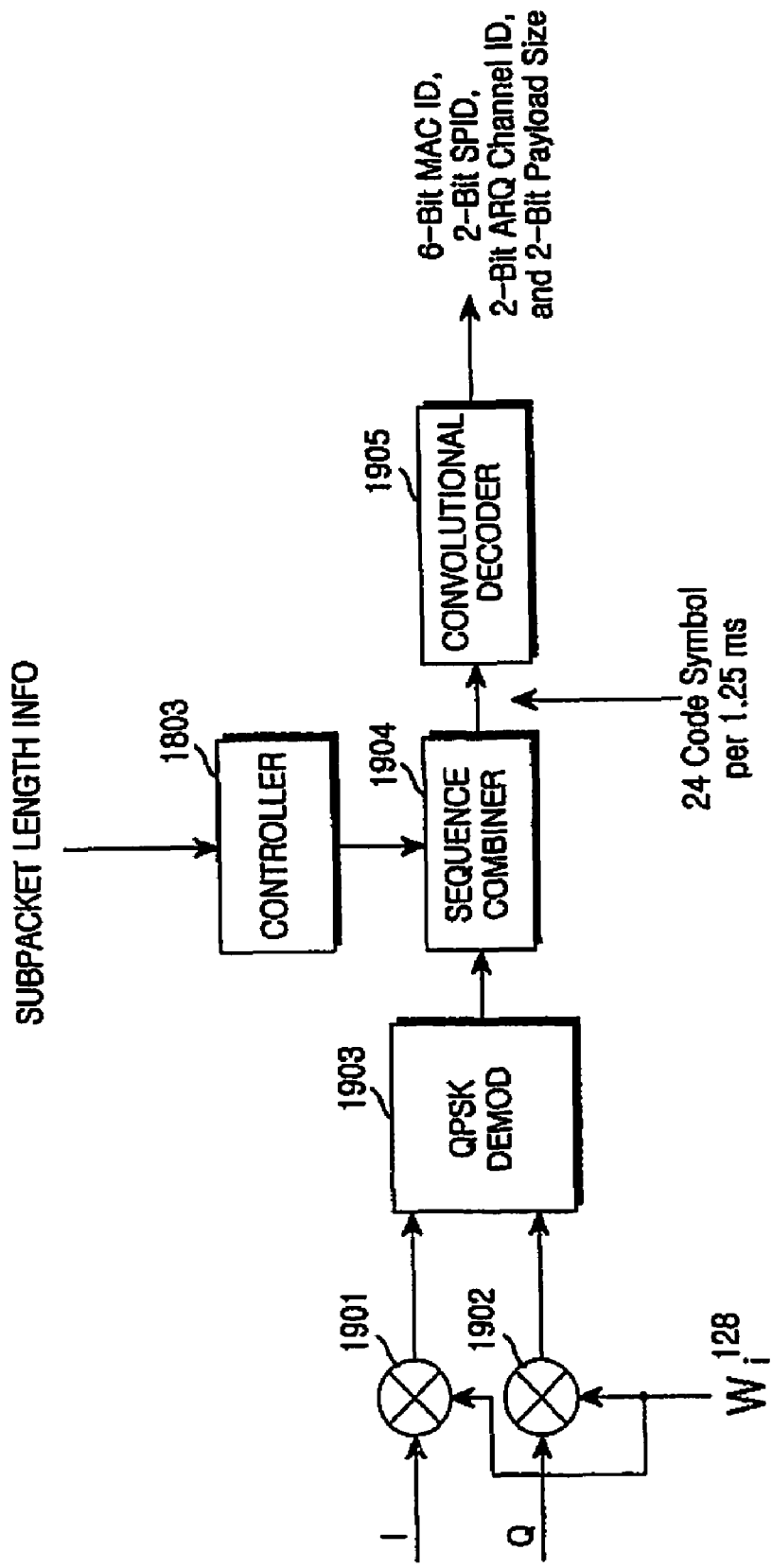
FIG. 19 illustrates a structure of a channel reception device for receiving the remaining control information excepting the subpacket length information by a terminal according to the third embodiment of the present invention.

FIG. 19 illustrates a structure of a channel reception device for receiving the remaining control information excepting the subpacket length information by a terminal according to the third embodiment of the present invention. The channel reception device of FIG. 19 has a structure corresponding to the channel transmission device of FIG. 17. The channel reception device of FIG. 19 is enabled when the measured energy value of the PPDCCH detected by the energy detector 1805 of FIG. 18 is greater than the threshold.

Referring to FIG. 19, despreaders 1901 and 1902 multiply received PN-despread signals by a Walsh function of length 128 used for Walsh spreading of the SPDCCH, for spreading, and output 12 symbols per slot. A QPSK demodulator 1903 QPSK-demodulates the 12 symbols from the despreaders 1901 and 1902, and outputs 24 demodulated symbols per slot. The controller 1803 receives the subpacket length information from the PPDCCH reception device of FIG. 18, and determines a sequence repetition number N indicating the number of slots over which the SPDCCH is transmitted, i.e., how many times the sequence has been repeated, by consulting Table 4 based on the subpacket length information. Further, the controller 1803 controls a sequence combiner 1904 based on the sequence repetition number N. The sequence combiner 1904, under the control of the controller 1803, generates 24 coded symbols by combining the demodulated symbols from the QPSK demodulator 1903. A decoder 1905 decodes the 24 coded symbols from the sequence combiner 1904 and outputs the remaining control information. For example, a R=½, K=9 convolutional decoder can be used for the decoder 1905. Here, the "remaining control information" may include 6-bit MAC ID information, 2-bit payload size information, 2-bit subpacket ID information and 2-bit ARQ channel ID information. The controller 1803 compares the MAC ID among the control information with the MAC ID assigned from the base station. If the MAC IDs are identical to each other, the controller 1803 demodulates the PDCH. Otherwise, if they are not identical to each other, the controller 1803 discards the buffered PDCH data.

As described above, the third embodiment of the present invention transmits the subpacket length information over the PPDCCH and the remaining control information over the SPDCCH. Here, the coded symbols of the PPDCCH are spread with a Walsh function shared by a plurality of terminals, before transmission.

Figure 20:
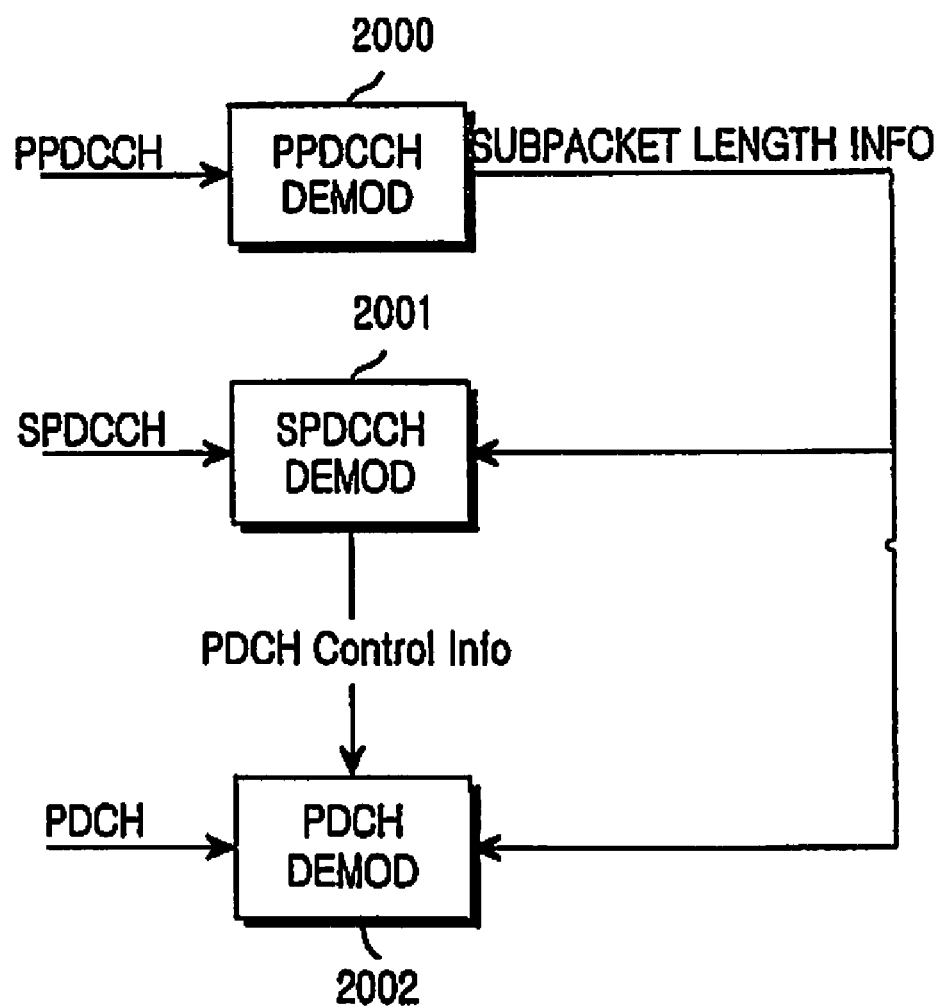
FIG. 20 is a diagram for explaining an overall operation of a terminal according to an embodiment of the present invention.

FIG. 20 is a diagram for explaining an overall operation of a terminal according to an embodiment of the present invention. Referring to FIG. 20, a PPDCCH demodulator 2000 measures reception energy of the PPDCCH and determines whether the measured energy value exceeds a predetermined threshold. If the measured energy value exceeds the threshold, the PPDCCH demodulator 2000 acquires MAC ID information and subpacket length information by demodulating and decoding the signal received over the PPDCCH. The acquired subpacket length information is provided to a SPDCCH demodulator 2001 and a PDCH demodulator 2002. Then, the SPDCCH demodulator 2001 acquires the remaining control information by demodulating and decoding the SPDCCH using the subpacket length information from the PPDCCH demodulator 2000. In the case of the first and second embodiments, the acquired remaining control information includes the subpacket ID information, the ARQ channel ID information and the payload size information, acquired through demodulation of the SPDCCH. In the case of the third embodiment, the acquired remaining control information includes the MAC ID information, the subpacket ID information, the ARQ channel ID information and the payload size information, acquired through demodulation of the SPDCCH. Thereafter, the remaining control information is provided to the PDCH demodulator 2002. The PDCH demodulator 2002 demodulates the PDCH using control information acquired through demodulation of the PPDCCH and the SPDCCH. According to the first embodiment of the present invention, if the MAC ID acquired by the PPDCCH demodulator 2001 is not identical to the MAC ID previously assigned by the base station, the SPDCCH demodulator 2001 and the PDCH demodulator 2002 are disabled. In accordance with the third embodiment of the present invention, if the MAC ID acquired from the SPDCCH is not identical to the MAC ID assigned from the base station, the PDCH demodulator 2002 is disabled and the buffered channel data is discarded.

As described above, the mobile communication system for high-speed packet transmission according to the present invention can effectively transmit various control information needed for demodulation of the packet data channel.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A terminal reception apparatus for receiving MAC (Medium Access Control) ID (Identification) information indicating a terminal to receive packet data transmitted by a base station and length information of the packet data in a mobile communication system for high-speed packet transmission, comprising:

a despreader for extracting symbols of a packet data control channel over which the MAC ID information and the length information are transmitted, by despreading a received signal with a Walsh code;

an energy detector for measuring energy of symbols output from the despreader and generating a packet data control detection signal when the measured energy value is greater than a threshold;

a length information generator operable in response to the packet data control detection signal, for extracting a Walsh code having a peak value by performing inverse fast Hadamard transform on the symbols from the despreader using a determined Walsh code based on the length information, and generating the length information according to the extracted Walsh code;

a Walsh decover section for Walsh-decovering the symbols from the despreader with the extracted Walsh code; and a decoder for generating the MAC ID information by decoding symbols from the Walsh decover section.

2. The terminal reception apparatus as claimed in claim 1, further comprising a demodulator connected between the Walsh decover section and the decoder, for demodulating the symbols form the Walsh decover section and outputting the demodulated symbols to the decoder.

3. The terminal reception apparatus as claimed in claim 1, further comprising a demodulator connected between the despreader and the length information generator, for demodulating the symbols from the despreader and outputting the demodulated symbols to the length information generator.

4. A terminal reception method in a mobile communication system for high-speed packet transmission, comprising the steps of:
   despreading a signal of a packet data control channel for receiving MAC (Medium Access Control) ID (Identification) information indicating a terminal to receive packet data and receiving length information of the packet data, using a predetermined Walsh code, and generating symbols;
   measuring energy of the generated symbols, and generating a packet data control detection signal when the measured energy value is greater than a threshold;
   extracting a Walsh code having a peak value by performing inverse fast Hadamard transform on the generated symbols using a Walsh code based on the length information in response to the packet data control detection signal, and generating the length information according to the extracted Walsh code;
   Walsh-decovering the generated symbols with the extracted Walsh code; and
   generating the MAC ID information by decoding the Walsh-decovered symbols.

5. The terminal reception method as claimed in claim 4, further comprising the steps of:
   comparing the generated MAC ID information with MAC ID information assigned from a base station;
   acquiring remaining control information by demodulating and decoding a signal of a channel for receiving remaining packet data control information excepting the MAC ID information and the length information, when the generated MAC ID information is identical to MAC ID information assigned from a base station; and
   demodulating and decoding a signal of a channel for receiving the packet data using the length information and the control information.

* * * * *